United States Patent
Cacciotto

(10) Patent No.: US 11,482,935 B2
(45) Date of Patent: Oct. 25, 2022

(54) CONTROL CIRCUIT FOR A FLYBACK CONVERTER, RELATED INTEGRATED CIRCUIT, ELECTRONIC FLYBACK CONVERTER AND METHOD

(71) Applicant: STMicroelectronics S.r.l., Agrate Brianza (IT)

(72) Inventor: Fabio Cacciotto, Motta S. Anastasia (IT)

(73) Assignee: STMicroelectronics S.r.l., Agrate Brianza (IT)

(*) Notice: Subject to any disclaimer, the term of this patent is extended or adjusted under 35 U.S.C. 154(b) by 78 days.

(21) Appl. No.: 17/174,001

(22) Filed: Feb. 11, 2021

(65) Prior Publication Data

US 2021/0257914 A1 Aug. 19, 2021

(30) Foreign Application Priority Data

Feb. 13, 2020 (IT) .................. 102020000002911

(51) Int. Cl.
*H02M 3/335* (2006.01)
*H02M 1/08* (2006.01)
*H02M 1/00* (2006.01)

(52) U.S. Cl.
CPC ......... *H02M 3/33515* (2013.01); *H02M 1/08* (2013.01); *H02M 3/33523* (2013.01); *H02M 1/0009* (2021.05)

(58) Field of Classification Search
CPC .............. H02M 3/33515; H02M 1/08; H02M 3/33523; H02M 1/0009; H02M 1/0058
See application file for complete search history.

(56) References Cited

U.S. PATENT DOCUMENTS

| 8,391,027 | B2 | 3/2013 | Lidak et al. |
| 9,083,250 | B2 | 7/2015 | Adragna |
| 2017/0047846 | A1 | 2/2017 | Teo et al. |
| 2018/0054113 | A1* | 2/2018 | Kim ................. H02M 1/4225 |
| 2019/0013729 | A1* | 1/2019 | Kim ................. H02M 1/4225 |

OTHER PUBLICATIONS

"ICE2QS03—Quasi-Resonant PWM Controller," Infineon, Datasheet, Version 2.2, 2011, 19 pages.

* cited by examiner

*Primary Examiner* — Adolf D Berhane
*Assistant Examiner* — Afework S Demisse
(74) *Attorney, Agent, or Firm* — Seed IP Law Group LLP

(57) ABSTRACT

A control circuit for a driving an electronic switch associated with a switching node of a flyback converter includes a comparison circuit configured to generate a switch-off signal by comparing a current measurement signal with a current measurement threshold signal. A valley detection circuit is configured to generate a trigger in a trigger signal when a valley signal indicates a valley in a voltage at the switching node of the flyback converter, and a blanking circuit is configured to generate a switch-on signal by combining the trigger signal with a timer signal provide by a timer circuit. The timer signal indicates whether a blanking time-interval has elapsed.

20 Claims, 10 Drawing Sheets

US 11,482,935 B2

CONTROL CIRCUIT FOR A FLYBACK CONVERTER, RELATED INTEGRATED CIRCUIT, ELECTRONIC FLYBACK CONVERTER AND METHOD

BACKGROUND

Technical Field

The embodiments of the present description refer to a control device for flyback converters, in particular quasi-resonant flyback converters.

Description of the Relevant Art

Electronic converters, such as for example AC/DC or DC/DC switched mode power supplies, are well known in the art. There exist many types of electronic converters that may be divided mainly into isolated and non-isolated converters. For example, non-isolated electronic converters are converters of the buck, boost, buck-boost, Cuk, SEPIC, and ZETA types. Instead, isolated converters comprise a transformer, such as flyback and forward converters. These types of converters are well known to the person skilled in the art.

For example, FIG. 1 shows an example of a flyback converter.

In the example considered, the electronic converter 20 comprises a first and a second input terminal 200a and 200b for receiving a DC input voltage $V_{in}$ and a first and a second output terminal 202a and 202b for providing a DC output voltage $V_{out}$. For example, the input voltage $V_{in}$ may be supplied by a DC voltage source 10, such as a battery. Generally, the DC input voltage $V_{in}$ may also be generated from an AC voltage via a rectifier circuit, such as a bridge rectifier. Conversely, the output voltage $V_{out}$ may be used to supply an electric load 30.

A flyback converter comprises a transformer T comprising a primary winding T1 and a secondary winding T2. Specifically, a first terminal of the primary winding T1 is connected (e.g., directly) to the (positive) input terminal 200a and a second terminal of the primary winding T1 is connected (e.g., directly) via (the current path of) an electronic switch SW to the (negative) input terminal 200b, which often represents a ground. Accordingly, the electronic switch SW is configured to connect the primary winding selectively to the input terminals 200a and 200b, i.e., the voltage $V_{in}$. For example, in the example considered, the electronic switch SW is implemented with an n-channel Field Effect Transistor (FET), such as an n-channel Metal-Oxide-Semiconductor Field-Effect Transistor (MOSFET), i.e., a NMOS. In this case, the drain terminal of the transistor SW is connected to the second terminal of the primary winding T1, representing a switching node SN of the flyback converter, and the source terminal of the transistor SW is connected to the terminal 200b.

Moreover, in the example considered, a diode D and the secondary winding T2 are connected (e.g., directly) in series between the output terminals 202a and 202b. For example, a first terminal of the secondary winding T2 may be connected (e.g., directly) via the diode D to the (positive) output terminal 202a and a second terminal of the secondary winding T2 may be connected (e.g., directly) to the (negative) output terminal 202b. Generally, in addition or as alternative to the diode D may be used an electronic switch.

Accordingly, the diode (and/or the electronic switch) D is configured to selectively connect the secondary winding T2 to the output terminals 202a and 202b.

Moreover, a capacitor C is often connected (e.g., directly) between the terminals 202a and 202b.

As well-known, a conventional flyback converter 20 is operated via a control circuit 210 essentially configured to drive the electronic switch SW with a respective drive signal DRV in order to regulate the output voltage $V_{out}$ or the output current $I_{out}$ provided via the terminals 202a and 202b to a given reference value. For example, for this purpose the control circuit 210 is configured to drive the switch SW periodically with two switching states having respective durations $T_{ON}$ and $T_{OFF}$. During the interval $T_{ON}$, when the switch SW is closed and the diode/switch D is opened, the primary winding T1 of the transformer T1 is (directly) connected to the input voltage $V_{in}$. Accordingly, the primary current Ipri and the magnetic flux in the transformer T increases, thereby storing energy in the transformer T. In this condition, the capacitor C supplies energy to the output terminals 202a and 202b, i.e., the load 30. Conversely, during the interval $T_{OFF}$, when the switch SW is opened and the diode/switch D is closed, the primary current Ipri drops to zero, while a secondary side current Isec starts flowing in the secondary winding, and the energy from the transformer core T recharges the capacitor C and supplies the load 30.

Specifically, in an ideal flyback converter, when the control circuit 210 turns off the electronic switch SW, the current Ipri in the primary winding T1 stops immediately, while the current starts to flow in the secondary side T2, because the diode/switch D closes. In a real transformer T, anyway, the two windings T1 and T2 are not perfectly coupled, and a leakage inductance remains in the primary side. Substantially, such a leakage inductance may be modelled via an inductance $L_S$ connected in series with the primary winding T1. Conversely, the magnetizing inductance of the transform T (used to model the magnetic flux) may be modelled with an inductance $L_M$ connected in parallel with the primary winding T1.

Thus, when the control circuit 210 turns off the electronic switch SW, the primary current Ipri continues to flow in the primary side T1 due to the leakage inductance $L_s$, thereby creating a spike on the primary winding T1. Specifically, the electronic switch SW has associated a parasitic capacitance CSW connected in parallel with the electronic switch SW, such as the parasitic drain-source capacitance of a respective FET. Thus, the current provided by the leakage inductance $L_S$ of the transformer T will charge this capacitance CSW. Typically, such a spike is followed by a ringing, which attenuates due to losses in the system, until all the energy, which was stored in the leakage inductance $L_S$ (when the electronic switch SW has been turn off), is dissipated.

In order to reduce this effect, flyback converters comprise often a snubber/clamp circuit 204.

For example, FIG. 2 shows an embodiment of such a snubber/clamp circuit 204.

Specifically, in FIG. 2, the clamp circuit 204 is connected in parallel with the primary winding T1 of the transformer T, and comprises a series connection of a clamp capacitor CS and a diode DS, i.e., the clamp capacitor CS and the diode DS are connected in series between the terminals of the primary winding T1. Generally, in addition or as alternative to the diode DS may be used an electronic switch. Often a resistor RS is connected (e.g., directly) in parallel with the capacitor CS.

Accordingly, the diode/switch DS is configured to selectively connect the capacitor CS (and optionally the resistor RS) in parallel with the primary winding T1.

Specifically, in the example considered, a first terminal of the primary winding T1 is connected (e.g., directly) to a first terminal of the capacitor CS and a second terminal of the primary winding T1 (i.e., switching node SN) is connected (e.g., directly) via the diode/switch DS to the second terminal of the capacitor CS.

Substantially, the addition of the capacitor CS and the diode/switch DS permits to deviate the energy in the leakage inductance $L_S$ into the clamp capacitor CS. Specifically, when the control circuit 210 turns off the electronic switch SW, the switching node SN (between the primary winding T1 and the electronic switch SW, e.g., the drain terminal of the transistor SW) rises as in a normal flyback converter (without clamp). Anyway, when the voltage at the switching node SN bypasses the voltage at the clamp capacitor CS, the diode/switch DS turns on and the primary current Ipri also flows to the capacitor CS until the primary current Ipri drops to zero. When using a switch DS, the energy stored on the capacitor CS may be given back to the system by turning on the electronic switch DS. Alternatively, the capacitor CS may discharge via the resistor RS.

Thus, typically the clamp circuit 204 is operated in a complementary mode, i.e., the diode/switch DS is opened when the electronic switch SW is closed, and the diode/switch DS is closed (often after a brief dead-time) when the electronic switch SW is opened.

As mentioned before that control circuit 210 is configured to drive the electronic switch SW with a switch-on duration $T_{on}$ and a switch-off duration $T_{off}$, and by varying the switch-on duration $T_{on}$ and/or the switch-off duration $T_{off}$ the control circuit 210 may control the energy transfer to the secondary side.

For example, a known solution consists in a Pulse-Width Modulation (PWM) of the drive signal DRV, wherein the duration $T_{SW}=T_{ON}+T_{OFF}$ of a switching cycle is constant, but the duty cycle $T_{ON}/T_{SW}$ is varied in order to obtain a given output voltage $V_{out}$ or output current Iout.

Another type of control is based on a Quasi-Resonant (QR) switching operation of the flyback converter. Specifically, in this case, the control circuit 210 is configured to switch-on the switch SW after the transformer demagnetization (i.e., when the secondary current Isec has become zero).

FIG. 3 shows in this respect an example of the voltage $V_{SN}$ at the switching node SN.

Specifically, as mentioned before the control circuit 210 is configured to close the switch SW for a given interval $T_{ON}$, e.g., by setting the drive signal DRV to high. Accordingly, the switch SW is opened at an instant $t_1$.

Once the switch SW is opened, the primary side current Ipri is still positive and thus charges the capacitances CSW associated with the switching node SN. As mentioned before, once exceeded the voltage at the capacitor CS, the primary side current Ipri will also charge the capacitor CS, and the voltage $V_{SN}$ at the switching node SN reaches a value Vin+$V_R$, where $V_R$ is the "reflected" voltage, i.e., the voltage at the secondary winding T2, i.e., the output voltage $V_{out}$ reported to the primary side T1 based on the turn ratio of the transformer T.

Once the voltage at the secondary side T2 becomes zero/negative, i.e., when the transformer T is demagnetized, the diode/switch D opens. Thus, the inductances of the transformer T (magnetizing inductance $L_M$ and leakage inductance $L_S$) are now connected with the capacitance CSW in series between the input terminals 200a and 200b, essentially implementing a LC resonant circuit, whereby a resonance with an amplitude $V_R$ and a period $T_R$ is generated (oscillating around Vin). Due to this resonance and also taking into account that the reflected voltage $V_R$ is usually smaller than Vin, the voltage $V_{SN}$ will decrease according to a (damped) oscillation, reaching minimum values at instants $t_3$, $t_3'$, $t_3''$, etc. Thus, by switching on the switch SW at one of the instants $t_3$, $t_3'$, $t_3''$, etc. (so called valley points) the switching losses may be reduced.

For example, FIG. 4 shows a possible implementation of the operation of the control circuit 210.

Specifically, in line with the description of FIG. 2, the control circuit 210 is configured to generate a drive signal DRV for the electronic switch SW connected in series with the primary winding T1 between the terminals 200a and 200b, wherein the intermediate node between the primary winding T1 and the electronic switch SW represents the switching node SN. Moreover, also in this case a clamp circuit 204 is connected to the switching node SN and a capacitance CSN is associated with the switching node SN, which is schematically shown via a capacitance connected between the switching node SN and the terminal 200b (ground). Generally, the capacitance CSN comprises the parasitic capacitance CSW of the electronic switch SW, possible other parasitic capacitances (e.g., of the traces of a respective printed circuit board) and optionally one or more capacitors connected to the switching node SN.

In the example considered, the control circuit 210 has associated:

a feedback circuit 212 configured to provide a feedback signal FB indicative of the output quantity to be regulated, e.g., the output voltage Vout;

a current measurement circuit 214 configured to generate a signal CS indicative of (e.g., proportional to) the current Ipri flowing through the primary winding T1 (at least) during the switch-on period $T_{ON}$; and a valley monitoring circuit 216, configured to generate a signal ZCD indicative of the valleys in the voltage $V_{SN}$ at the switching node SN, such as a demagnetization monitoring circuit configured to generate a signal indicative of magnetization and demagnetization of the transformer T (at least) during the switch-off period $T_{OFF}$.

For example, in FIG. 4, the current measurement circuit 214 is implemented with a current sensor, such as a resistor RCS, connected in series with the switch SW, e.g., between the source terminal of a respect n-channel FET SW, and the terminal 200b (ground), wherein the voltage (corresponding to the signal CS) at the resistor RCS is proportional to the current flowing through the switch SW.

Conversely, in the example considered, the valley/demagnetization monitoring circuit 216 is implemented with an auxiliary winding of the transformer T, whereby the voltage at the auxiliary winding is indicative of the magnetization of the transformer T (at least) during the switch-off period $T_{OFF}$, because the voltage reaches zero when the transformer T is demagnetized. Moreover, in the example considered, the demagnetization monitoring circuit 216 comprises an optional voltage divider, e.g., implemented with two resistors R1 and R2 connected (e.g., directly) in series between the terminals of the auxiliary winding Taux, wherein preferably one of the terminals of the auxiliary winding Taux is connected to the terminals 200b (ground). Thus, in the example considered, the voltage at the resistor R1 (corresponding to the signal ZCD) is proportional to the voltage at the terminals of the auxiliary winding Taux.

In general, one or more of the following circuits may also be implemented together with the control circuit 210 in an integrated circuit:

the electronic switch SW;

at least part of the feedback circuit 212;

the current measurement circuit 214; and/or the voltage divider R1/R2.

Accordingly, the control circuit 210 may generate the drive signal DRV as a function of the signals CS, FB and ZCD. For example, the control circuit 210 may:

- open the electronic switch SW, e.g., set the signal DRV to low, when the signal CS reaches a given reference value, wherein the reference value is determined as a function of the feedback signal FB; and
- close the electronic switch SW, e.g., set the signal DRV to high, when the signal ZCD reaches zero or becomes negative, which indicates a valley in the voltage $V_{SN}$/a demagnetization of the transformer T.

For example, the feedback circuit 212 or the control circuit 210 may implement a regulator having at least an integral (I) component, whereby the reference value for the comparison with the signal CS is increase/decreased until the output quantity (Vout or Iout) corresponds to a given requested value.

Thus, essentially, the switch SW is switched off at a given peak value of the current Ipri and switched on at one of the valley points $t_3$. Specifically, in such a current-mode QR flyback converter, the switching activity is achieved by synchronizing the turn-on of the switch SW with the valley of the voltage $V_{SN}$/transformer demagnetization, e.g., by detecting the resulting negative-going edge of the voltage across the auxiliary winding Taux of the transformer T, which is connected to a pin of the control circuit 210, usually called zero-current detection pin (ZCD pin).

Thus, the solution shown in FIG. 4 work close to the boundary between discontinuous (DCM) and continuous conduction (CCM) of the transformer T, with a mode of operation which is commonly called "valley switching".

Usually a QR flyback converter is switched at the first valley, which (as shown in FIG. 3) occurs after a time $T_V$ between the demagnetization instant (instant $t_2$) and the first valley (instant $t_3$), wherein this time $T_V$ corresponds to half of the resonance period $T_R$, i.e., $T_V = T_R/2 = 1/(2f_R)$.

Specifically, concerning the operation of the converter described with respect to FIG. 4, the switching frequency $f_{SW}$ of a QR flyback converter can be expressed by the following equation:

$$f_{SW} = \frac{2 \cdot f_T}{1 + \frac{f_T}{f_R} + \sqrt{1 + 2\frac{f_T}{f_R}}} \quad (1)$$

where $f_R$ is the resonance frequency between the inductance $L_P$ of the primary winding T1 (i.e., $L_P = L_S + L_M$) and the capacitance CSN associated with the switching node SN, i.e.:

$$f_R = \frac{1}{2\pi\sqrt{L_P \cdot C_{SN}}} \quad (2)$$

and $f_T$ is the transition frequency, which corresponds to the frequency the converter would operate at if the converter would work in the transition mode, i.e., at the boundary between the continuous and the discontinuous conduction mode, i.e., with $T_R = 1/f_R \to 0$, i.e.:

$$f_T = \frac{V_R^2}{2 \cdot P_{INt} \cdot L_P (1 + M)^2} \quad (3)$$

where $V_R$ is again the reflected voltage (i.e., the output voltage Vout reported to the primary winding T1 through the primary-to-secondary turn ratio), the parameter M is the ration $V_R$/Vin, and $P_{INt}$ is the transformer's input power.

As described in the foregoing, a QR flyback converter has many advantages compared to a fixed frequency (PWM) operation, in particular the reduction of switching losses, because the switch SW is closed when the voltage across the switch SW reaches a minimum value.

However, a QR flyback converter has also disadvantages, in particular deriving from the variable frequency, depending on the operative conditions. In fact, as shown in equations (1), (2) and (3), the switching frequency $f_{SW}$ increases as the input voltage Vin increases and/or the load decreases. This behavior may have a big impact in the converter switching losses, which could it render difficult to meet efficiency recommendations and regulation, such as EuP, EU CoC or DoE.

To overcome this issue, the control circuit 210 may be configured to not switch the switch SW at the first valley ($t_3$) but at one of the following valleys ($t_3'$, $t_3''$, etc.), thereby preventing that the switching frequency $f_{SW}$ exceeds a given threshold value. For example, for this purpose, the control circuit 210 may comprise a circuit configured to mask the signal ZCD or a respective trigger signal $T_{ZCD}$ generated by a zero-current-detector/comparator of the control circuit 210 as a function of the signal ZCD.

For example, a possible solution consists in masking the triggering signal $T_{ZCD}$ coming from the zero-current-detector/comparator with a timer circuit having a respective blank interval $T_{BLANK}$, which ensures that the switch SW remains opened at least until the interval $T_{BLANK}$ ends. This blanking time $T_{BLANK}$ may start either when the switch SW is turned on (at one of the instants $t_3$) or when the switch SW is turned off (at the instant $t_1$). In this way, when one or more pulses of the trigger signal $T_{ZCD}$ is within the $T_{BLANK}$ window, the switch-on of the switch SW is delayed until the first valley occurs after the time $T_{BLANK}$ has elapsed, thereby limiting the maximum value of the switching operating frequency. This function is sometimes referred to as "valley-skipping".

Therefore, the total switching period $T_{SW}$ is given by:

$$T_{SW} = \frac{1}{f_T} + T_{V(k)} \quad (4)$$

where $T_{V(k)}$ corresponds to the time from the demagnetization of the transformer (instant $t_2$) and the k-th valley, and may be calculated, e.g., by:

$$T_{V(k)} = \frac{2 \cdot k - 1}{2 \cdot f_R} \quad (5)$$

In general, the blanking time $T_{BLANK}$ may be either fixed or variable. For example, in some commercially available control circuits 210 (implemented in a respective IC), the blanking time $T_{BLANK}$ may is variable as function of the feedback level FB to gradually decrease the operating frequency $f_{SW}$ with the load. Alternatively, may be used the current sense signal CS, because with a lower load, also the (peak value of the) signal CS is smaller.

Therefore, more and more ringing cycles are skipped and the operating frequency gradually decays. For example, based on the load conditions (and thus also based on the input power), the control circuit 210 may operate the electronic converter with the following modes:

when the input power exceeds a first value, a quasi-resonant mode, wherein the switch SW is switched on with the first valley;

when the input power is smaller than the first value, a valley skipping mode, wherein one or more of the valleys are skipped in order to limit the switching frequency $f_{SW}$, and when the input power is smaller than a second value (which is smaller than the first value), optionally with a burst mode, wherein the control circuit generates one or more switching cycles, e.g., until the output voltages exceeds a given upper threshold, and then waits until the output voltage falls below a given lower threshold.

However, a sequence of switching cycles may be unregular when the blanking time $T_{BLANK}$ ends near one of the valleys, because in this case the control circuit 210 may switch during a cycle at a valley i and during the following cycle at the valley i−1, and vice versa. This "valley-jump" phenomenon may introduce a low-frequency component in the primary current Ipri that may fall in the audible range. If this periodic perturbation is sufficiently large in amplitude, audible noise may be generated, e.g., by mechanical vibrations of the magnetic components.

Various control circuits are known which address this valley jump issue. For example, ON Semiconductors provides two QR flyback controllers (NCP1379, NCP1380) equipped with a "valley lock-out" function, as also described in U.S. Pat. No. 8,391,027 B2. Similarly, Infineon provides a family of QR flyback controllers (ICE2QS03x) equipped with a "digital frequency reduction with decreasing load" function.

Also, the present applicant already disclosed a "valley lock-out" function in U.S. Pat. No. 9,083,250 B2. Substantially, the method defines a baseline blanking time $T_{BLANK\_0}$ (either fixed or function of the current sense signal CS) and a cycle-by-cycle dynamically adjustable blanking time $T_{BLANK}$ initially set equal to $T_{BLANK\_0}$. A counter counts the number i of valleys after transformer demagnetization in each switching cycle with a resettable N-bit counter, until the switch SW is turned-on with the first valley after the end of the time $T_{BLANK}$. The value k is sampled and used to determine the blanking time $T_{BLANK}$ of the next switching cycle by offsetting the baseline blanking time $T_{BLANK\_0}$ proportionally to the sampled value k, for example by using the relationship:

$$T_{BLANK} = T_{BLANK\_0} + i \, \Delta T_B$$

where $\Delta T_B$ is a proper "time hysteresis" that ensure a stable steady-state operation with a given number of skipped valleys.

BRIEF SUMMARY

Considering the foregoing, it is therefore an object of various embodiments to provide alternative solutions for driving a quasi-resonant flyback converter, in particular in order to prevent or at least reduce valley jumps.

According to one or more embodiments, one or more of the above objects are achieved by a control circuit for a flyback converter having the distinctive elements set forth specifically in the ensuing claims. Embodiments moreover concern a related integrated circuit, electronic flyback converter and method.

The claims form an integral part of the technical teaching of the description provided herein.

As mentioned before, various embodiments of the present disclosure relate to a control circuit for a flyback converter. Such a flyback converter usually comprises a positive and a negative input terminal for receiving an input voltage, and two output terminals for providing an output voltage or output current. The flyback converter comprises also a transformer having a primary winding and a secondary winding, an electronic switch and a further electronic switch, such as a diode. For example, a first terminal of the primary winding may be connected to the positive input terminal and a second terminal of the primary winding may represent a switching node. The electronic switch may be connected between the switching node and the negative input terminal. The further electronic switch may be connected with the secondary winding in series between the two output terminals.

In various embodiments, the control circuit is thus configured to generate a drive signal for the electronic switch, wherein the control circuit is configured to generate switching cycles by setting the drive signal to a first logic level for a switch-on duration for closing the electronic switch and a second logic level for a switch-off duration for opening the electronic switch.

In various embodiments, the control circuit comprises a terminal configured to be connected to a current measurement circuit configured to generate a current measurement signal indicative of the current flowing through the primary winding during the switch-on duration, and a terminal configured to be connected to a valley monitoring circuit configured to provide a valley signal indicative of valleys in the voltage at the switching node.

In various embodiments, the control circuit further comprises a comparison circuit configured to generate a switch-off signal by comparing the current measurement signal with a current measurement threshold signal, and a valley detection circuit configured to generate a trigger in a trigger signal when the valley signal indicates a valley in the voltage at the switching node. For example, the valley detection circuit may comprise a comparator circuit configured to compare the valley signal with a reference signal, and an edge detector configured to generate a pulse in the trigger signal when the signal at the output of the comparator circuit is set.

In various embodiments, the control circuit further comprises also a blanking circuit configured to generate a switch-on signal by combining the trigger signal with a timer signal provide by a timer circuit, wherein the timer signal indicates whether a blanking time-interval has elapsed. For example, the timer circuit may be implemented with a digital counter circuit configured to reset an internal count value in response to the switch-on signal or the switch-off signal, increase the internal count value in response to a clock signal, and set the timer signal to a first logic level when the internal count value is smaller than a reference value indicative of the duration of the blanking time-interval and to a second logic level when the internal count value is greater than the reference value. In various embodiments, the reference value may be determined as a function of the feedback signal, the current measurement signal or the current measurement threshold signal.

Accordingly, in various embodiments, the control circuit may comprises a (driver) circuit configured to set the drive signal to the first logic level for closing the electronic switch in response to the switch-on signal, and set the drive signal to the second logic level for opening the electronic switch in response to the switch-off signal.

Specifically, in various embodiments, the blanking circuit is configured to start the timer circuit in response to either the switch-on signal or the switch-off signal. Next, the blanking circuit monitors during each switching cycle a first number of triggers in the trigger signal, whereby the first number is indicative of the number of valleys in the voltage at the switching node until the electronic switch is closed, and monitors during each switching cycle a second number of triggers in the trigger signal until the timer signal indicates that the blanking time-interval has elapsed, whereby the second number is indicative of the number of valleys in the voltage at the switching node during the blanking time-interval. For example, for this purpose, the blanking circuit may comprises a first digital counter configured to increase the first number in response to the trigger signal and reset the first number in response to the switch-on signal or the switch-off signal, and/or a second digital counter configured to, when the timer signal indicates that the blanking time-interval has not elapsed, increase the second number in response to the trigger signal and reset the second number in response to the switch-on signal or the switch-off signal.

In various embodiments, the blanking circuit is configured to determine whether the blanking signal indicates that the blanking time-interval has elapsed and whether the first number reaches or exceeds a given maximum value. When the first number exceeds the maximum value, the blanking circuit stores the first number as new maximum value. When the blanking signal indicates that the blanking time-interval has not elapsed or the second number is smaller than a given maximum value, the blanking circuit disables the switch-on signal. When the blanking signal indicates that the blanking time-interval has elapsed and the second number reaches or exceeds the given maximum value, the blanking circuit sets the switch-on signal in response to the trigger signal. For example, for this purpose, the blanking circuit may comprise a combinational logic circuit configured to generate the switch-on signal by combining the trigger signal with a blanking signal, and a comparator circuit configured to set a blanking signal to a first logic level when the blanking signal indicates that the blanking time-interval has not elapsed or the second number is smaller than a given maximum value, and a second logic level when the blanking signal indicates that the blanking time-interval has elapsed and the second number reaches or exceeds the given maximum value.

In various embodiments, the blanking circuit is configured to selectively reset the maximum value by comparing the second number with the first number or the maximum value. For example, in various embodiments, the blanking circuit comprises a comparator circuit configured to set a blanking signal by comparing the second number with the first number, thereby determining a first condition when the second number is smaller than the first number minus a first threshold value, a second condition when the second number is equal to or greater than the first number minus the first threshold value, but smaller than the first number minus a second threshold value, and a third condition when the second number is equal to or greater than the first number minus the second threshold value. In this case, the blanking circuit may comprises a reset circuit configured to reset the maximum value when the comparator circuit indicates the first condition for a first number of consecutive switching cycles, or when the comparator circuit indicates the second condition for a second number of consecutive switching cycles, the second number of consecutive switching cycles being greater than the first number of consecutive switching cycles.

In various embodiments, the control circuit may also comprise a terminal configured to be connected to a feedback circuit configured to provide a feedback signal indicative of the output voltage or output current, and a regulator circuit comprising an integral component, and optionally a proportional and/or derivative component, configured to generate the current measurement threshold signal as a function of the feedback signal. In this case, the reset circuit may be configured to periodical store the value of the feedback signal and reset the maximum value when the feedback signal increases more than a given amount.

Additionally or alternatively, the reset circuit may be configured to determine whether the current measurement signal reaches a maximum threshold signal, and reset the maximum value when the current measurement signal reaches the maximum threshold signal for a given number of consecutive switching cycles.

BRIEF DESCRIPTION OF THE SEVERAL VIEWS OF THE DRAWINGS

The features and advantages of the present disclosure will become apparent from the following detailed description of practical embodiments thereof, shown by way of non-limiting example in the accompanying drawings, in which.

DETAILED DESCRIPTION

In the ensuing description, various specific details are illustrated aimed at enabling an in-depth understanding of the embodiments. The embodiments may be provided without one or more of the specific details, or with other methods, components, materials, etc. In other cases, known structures, materials, or operations are not shown or described in detail so that various aspects of the embodiments will not be obscured.

Reference to "an embodiment" or "one embodiment" in the framework of this description is meant to indicate that a particular configuration, structure, or characteristic described in relation to the embodiment is comprised in at least one embodiment. Hence, phrases such as "in an embodiment", "in one embodiment", or the like that may be present in various points of this description do not necessarily refer to one and the same embodiment. Moreover, particular conformations, structures, or characteristics may be combined in any adequate way in one or more embodiments.

The references used herein are only provided for convenience and hence do not define the sphere of protection or the scope of the embodiments.

In FIGS. 5 to 12 described below, parts, elements or components that have already been described with reference to FIGS. 1 to 4 are designated by the same references used previously in these figures. The description of these elements has already been made and will not be repeated in what follows in order not to burden the present detailed description.

Figure 1:
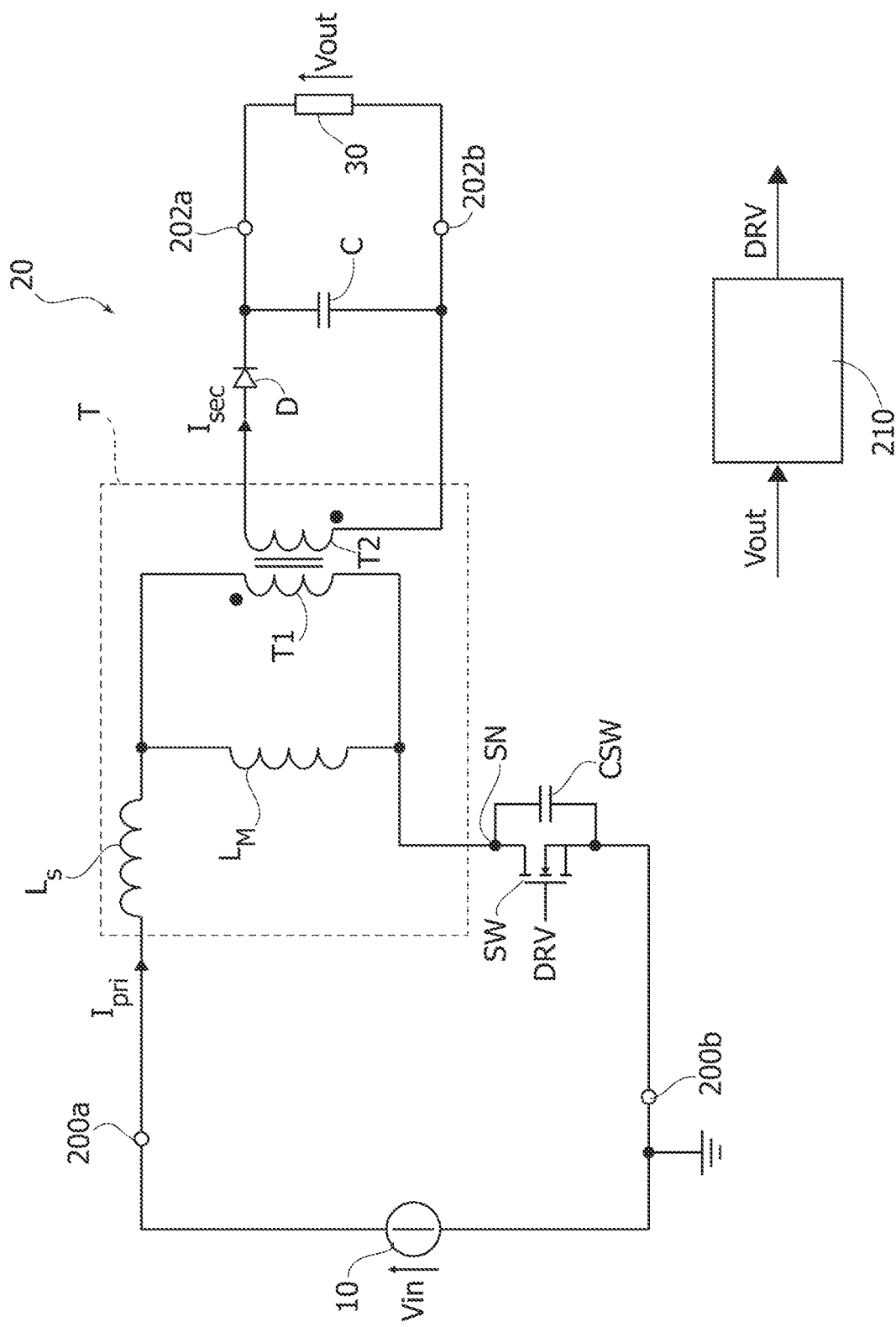
FIG. 1 shows a circuit schematic of a flyback converter.
Figure 2:
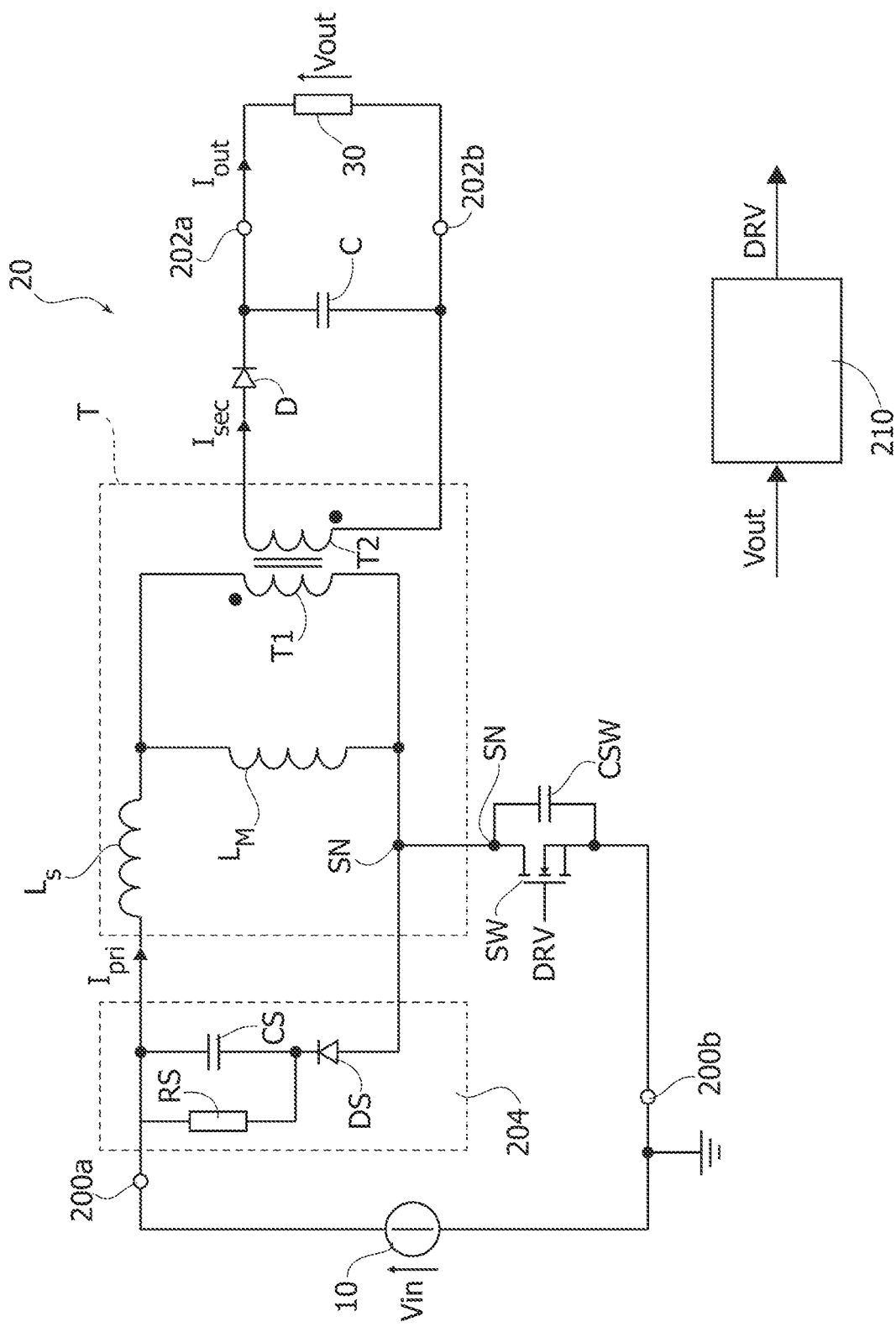
FIG. 2 shows a circuit schematic of a flyback converter with a clamp circuit.
Figure 3:
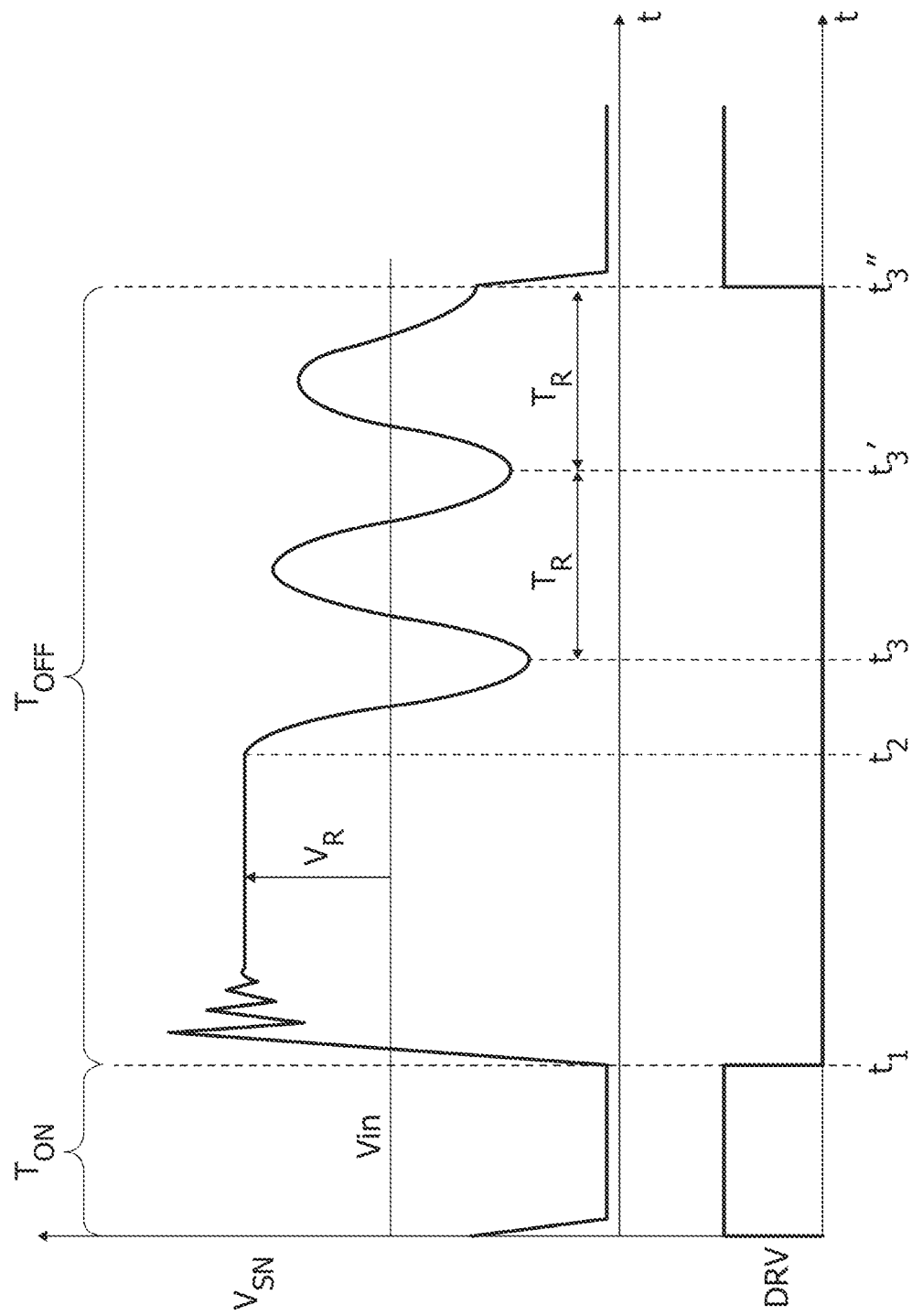
FIG. 3 shows exemplary waveforms of the converter of FIG. 2.
Figure 4:
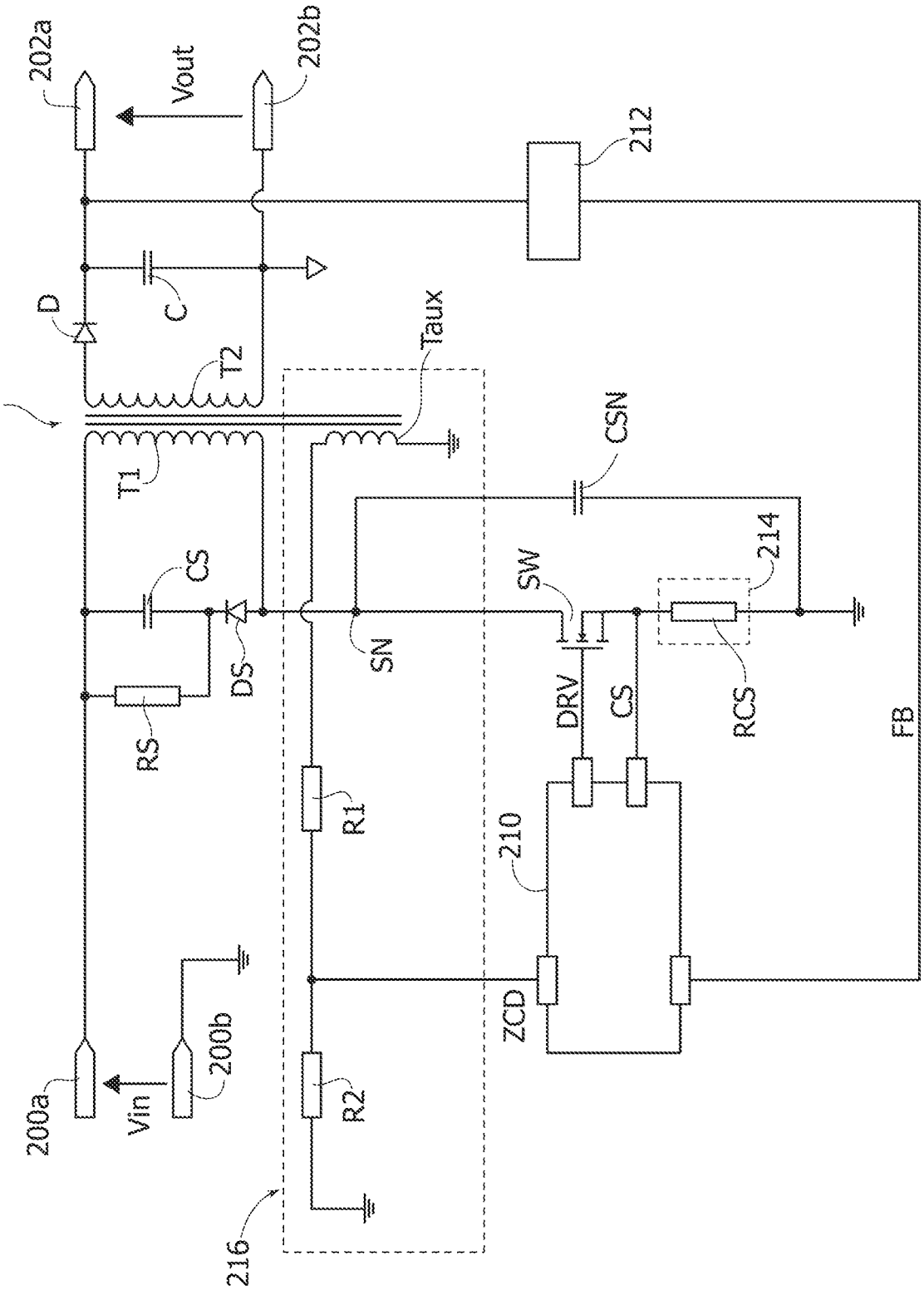
FIG. 4 shows a circuit schematic of a flyback converter comprising a quasi-resonant control circuit.
Figure 5:
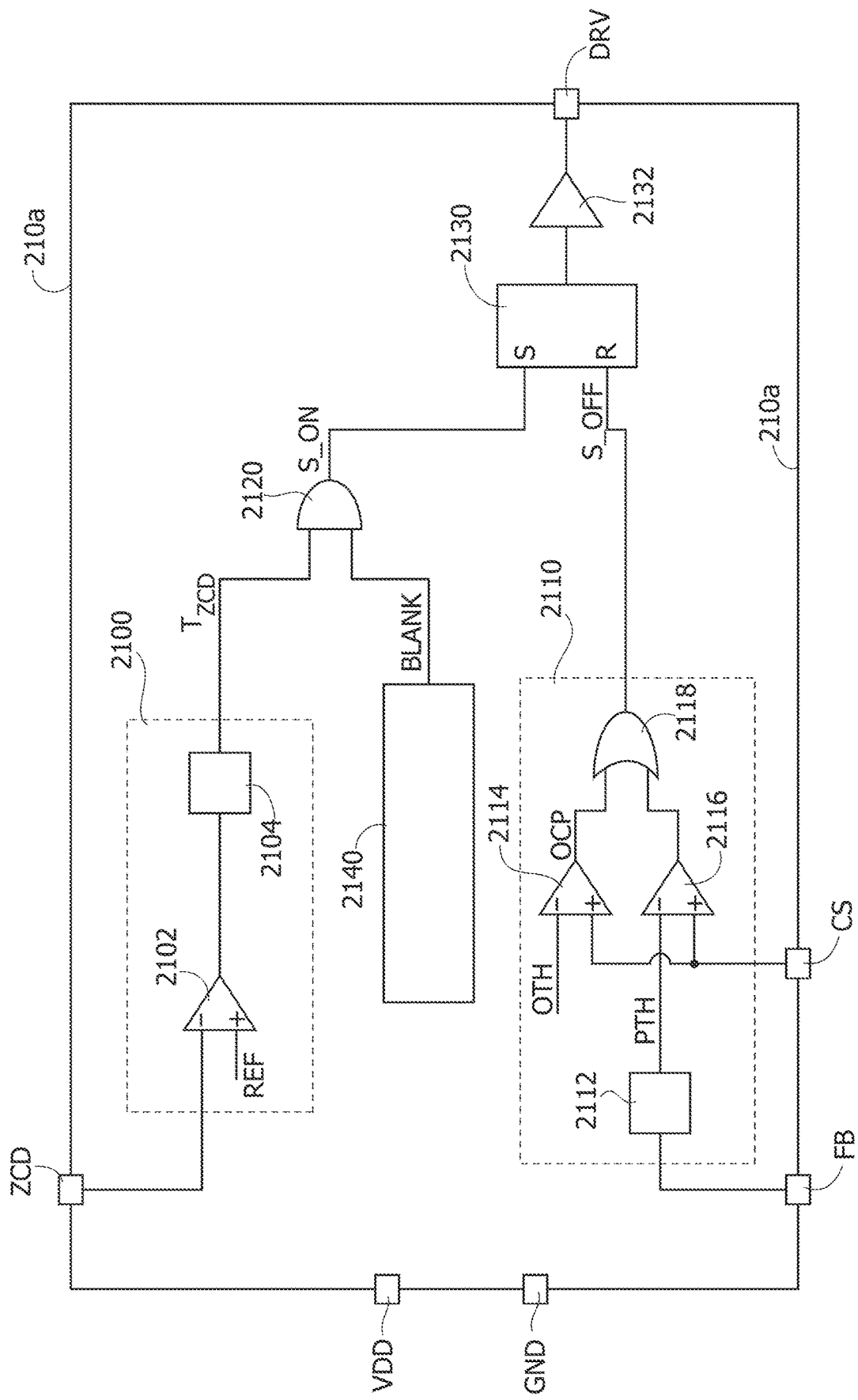
FIG. 5 shows a first embodiment of a quasi-resonant control circuit in accordance with the present description.

FIG. 5 shows an embodiment of a control/driver circuit 210a for a flyback converter according to the present disclosure. For a general description of a quasi-resonant flyback converter, reference can be made to the previous description, in particular with respect to FIGS. 2 and 4.

Specifically, in the embodiment shown in FIG. 5, the control circuit 210a, such as an integrated circuit, comprises:
- two terminals for receiving a supply voltage, such as a (positive) terminal VDD and a ground terminal GND;
- a terminal configured to be connected to a feedback circuit 212 providing a feedback signal FB indicative of the output quantity to be regulated, e.g., the output voltage Vout or the output current Iout;
- a terminal configured to be connected to a current measurement circuit 214 configured to generate a signal CS indicative of (e.g., proportional to) the current Ipri flowing through the primary winding T1 (at least) during the switch-on period $T_{ON}$; and
- a terminal configured to be connected to a valley/demagnetization monitoring circuit 216 configured to generate a signal ZCD indicative of the valleys in the voltage $V_{SN}$, e.g., the magnetization and demagnetization of the transformer T (at least) during the switch-off period $T_{OFF}$.

In the embodiment considered, the control circuit 210 comprises a terminal for providing the drive signal DRV to an external electronic switch SW, such as the gate terminal of a respective n-channel FET, e.g., a NMOS.

Figure 6:
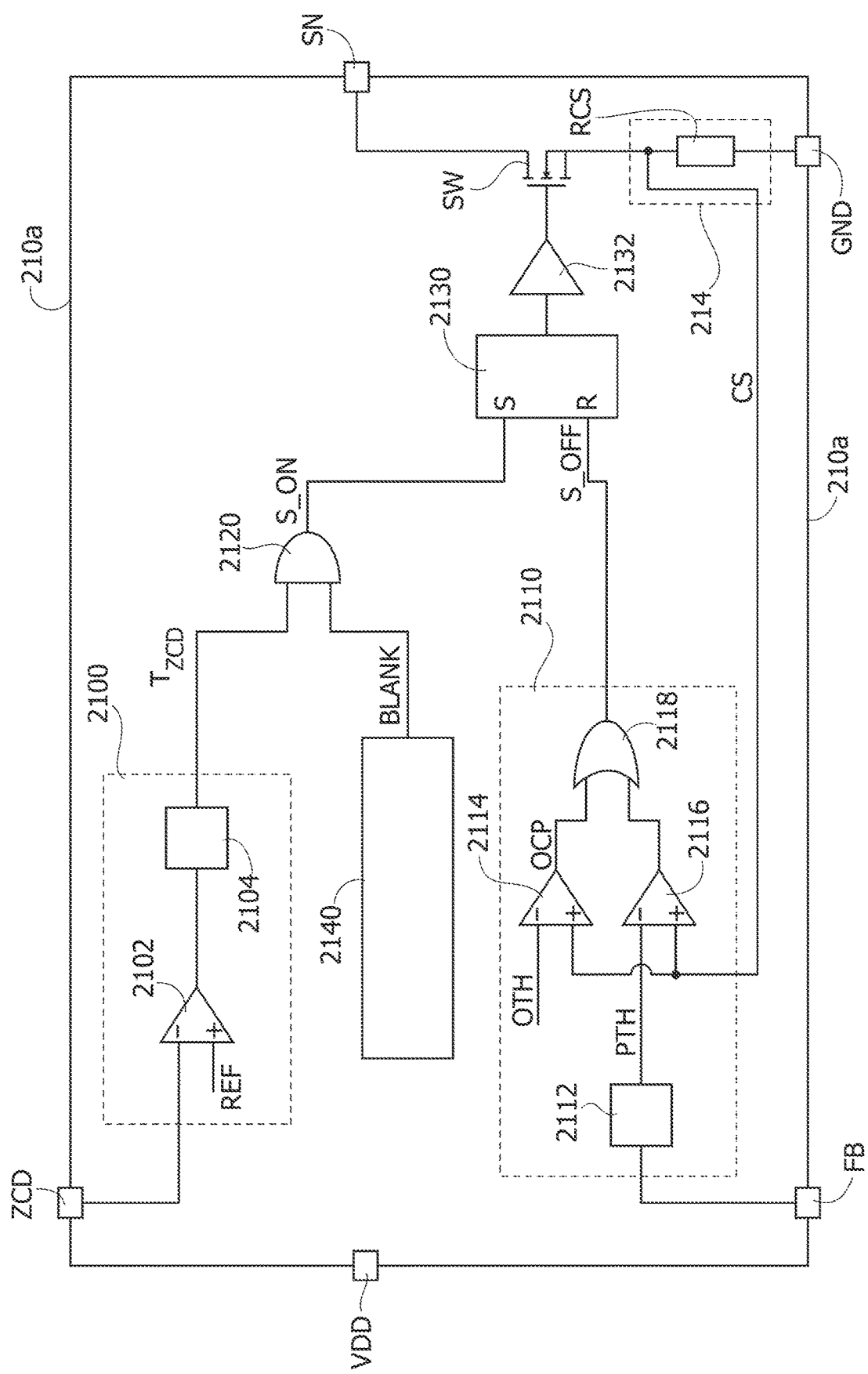
FIG. 6 shows a second embodiment of a quasi-resonant control circuit in accordance with the present description.

Conversely, FIG. 6 shows an embodiment, wherein the electronic switch SW is integrated in the integrated circuit of the control circuit 210a. In this case, the control circuit 210a may comprise a terminal configured to be connected to the switching node SN. For example, when the electronic switch SW is an n-channel FET, e.g., a NMOS, the drain terminal of this n-channel FET SW may be connected (e.g., directly) to the terminal SN.

In various embodiments, the current measurement circuit 214 may be implemented with a current sensor, such as a resistor RCS, connected in series with the switch SW, e.g., between the source terminal of a respect n-channel FET SW, and the ground terminal GND, wherein the voltage at the resistor RCS is proportional to the current flowing through the switch SW. Also in this case, the current measurement circuit 214, e.g., the resistor RCS, may be internal (see FIG. 6) or external (see FIG. 5) with respect to the integrated circuit of the control circuit 210a.

In various embodiments, the control circuit 210a comprises a comparison circuit 2110 configured to compare the signal CS indicative of the primary side current Ipri with a threshold signal PTH.

Specifically, in various embodiments, the switch SW is switched off when the value CS reaches (or exceeds) the value of the threshold signal PTH. Accordingly, in various embodiments, the comparison circuit 2110 comprises a (preferably analog) comparator 2116 configured to generate a signal S_OFF indicating that the switch SW should be switched off by comparing the signal CS with the threshold signal PTH.

In various embodiments, the comparison circuit 2110 comprises also a second (preferably analog) comparator 2114 configured to generate a signal OCP by comparing the signal CS with a second threshold signal OTH indicative of a maximum value, thereby implementing an over-current protection. In this case, the signals at the output terminals of the comparators 2116 and 2114 may be combined, e.g., via a logic OR gate 2118, in order to generate the signal S_OFF. In case such an over-current protection is not used, the signal S_OFF may correspond directly to the comparison signal at the output of the comparator 2116.

In various embodiments, the threshold signal PTH is generated as a function of an output quantity, i.e., the output voltage Vout or the output current Iout. For example, in various embodiments, the electronic converter comprises for this purpose:
- a feedback circuit 212 configured to generate a feedback signal FB indicative of the output quantity, such as a voltage or current sensor, optionally comprising also an optocoupler (or other kinds of transmission circuits) for transmitting the feedback signal FB from the secondary side to the primary side of the transformer T; and
- a regulator circuit 2112 comprising an integral component (I), and optionally a proportional (P) and/or derivative (D) component, configured to generate the threshold signal PTH as a function of the feedback signal FB.

In various embodiments, the feedback signal FB may be proportional to the output quantity or may already represent an error signal indicative of the difference between the output quantity and a requested value for the output quantity.

In various embodiments, at least part of the regulator circuit 2112 and/or the feedback circuit 212 may be implemented in the integrated circuit of the control circuit 210a. For example, in FIGS. 5 and 6, the regulator 2112 is implemented directly within the control circuit 210a.

In the embodiment considered, for switching the switch SW on, the control circuit 210a comprises:
- a valley/demagnetizing detection circuit 2100 configured to analyze the signal ZCD provided by the valley/demagnetization monitoring circuit 216 and generate a trigger signal $T_{ZCD}$ where the signal ZCD indicates a valley in the voltage $V_{SN}$/demagnetization of the transformer T; and
- a blanking circuit 2140 configured to generate a signal BLANK used to enable the valley/demagnetizing detection circuit 2100.

For example, in the embodiment considered, the valley/demagnetizing detection circuit 2100 comprises:
- a comparator 2102 configured to compare the signal ZCD with a reference signal REF, which usually is close to 0 V, wherein the output of the comparator 2102 is set when the signal ZCD falls below the value of the reference signal REF; and
- an edge detector 2104 configured to generate a pulse in the signal $T_{ZCD}$ when the signal at the output of the comparator 2100 is set.

In the embodiment considered, the valley/demagnetizing detection circuit 2100 is enabled via a logic gate 2120, such as a AND gate, configured to generate a signal S_ON indicating that the switch SW should be switched on as a function of the trigger signal $T_{ZCD}$ and the signal BLANK, i.e., the signal BLANK masks the signal $T_{ZCD}$.

Accordingly, in the embodiment considered, the signals S_ON and S_OFF may be provided to a latch or flip-flop 2130, e.g., the set and reset input of a respective set-reset latch or flip-flop, and the signal at the output of the latch or flip-flop 2130 may be used to drive the switch SW, e.g., via an optional FET driver circuit 2132 configured to generate the drive signal DRV as a function of the signal at the output of the latch or flip-flop 2130.

Thus, in addition to the circuits 2100-2140, (at least) one or more of the following circuits may also be implemented together with the control circuit 210 in an integrated circuit:
the electronic switch SW;
the driver circuit 2132;
at least part of the feedback circuit 212, such as a respective optocoupler;
the current measurement circuit 214, such as the resistor RCS; and/or
the valley/demagnetization monitoring circuit 216, such as the voltage divider R1/R2.

Figure 7:
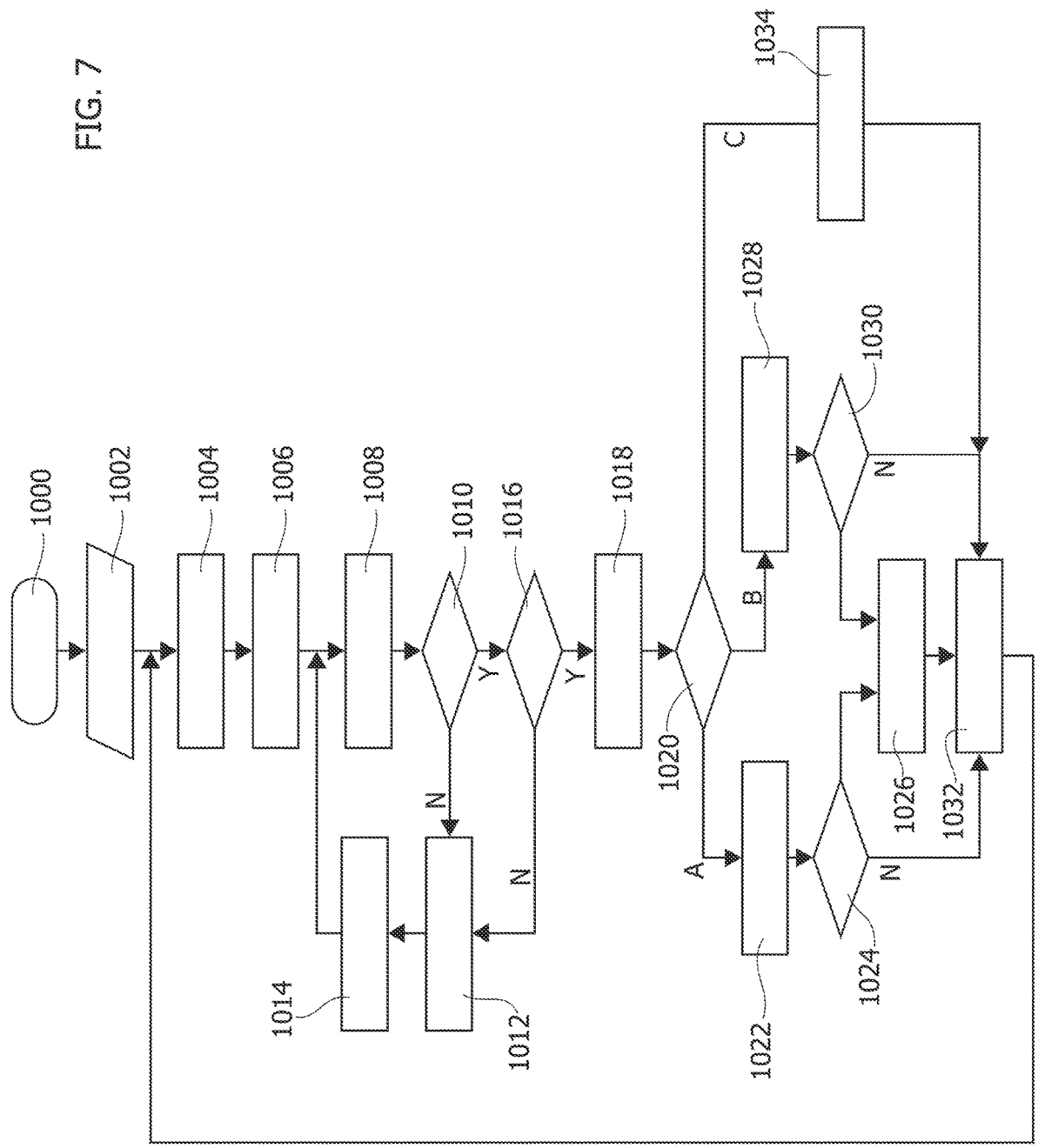
FIG. 7 shows an embodiment of the operation of the control circuits of FIG. 5 or 6.

FIG. 7 shows a first embodiment of the operation of the blanking circuit 2140.

After a start step 1000, e.g., corresponding to the power-on of the control circuit 210a, the blanking circuit 2140 performs at a step 1002 an initialization operation. During this step, the blanking circuit 1040 determines a value indicative of a requested blanking time $T_{BLANK}$. General, the blanking time $T_{BLANK}$ may be predetermined/constant, or the blanking circuit 1040 may be configured to determine the blanking time $T_{BLANK}$ as a function of the input or output power level, as indicated, e.g., by the feedback signal FB or the threshold signal PTH used as peak value for the signal CS, i.e., the blanking circuit 1040 may determine the blanking time $T_{BLANK}$ as a function of (at least one of) the feedback signal FB, the threshold signal PTH or the signal CS. Moreover, the blanking circuit 1040 may initialize other parameters, such as parameters k and $k_M$.

Next, the blanking circuit 1040 starts at a step 1004 a timer circuit configured to determine when the blanking time $T_{BLANK}$ elapses. For example, the timer circuit may be stared when the switch SW is opened (instant $t_1$) or when the switch SW is closed (one of the instants $t_3$). For example, in the embodiment shown in FIGS. 5 and 6, the blanking circuit 1040 may set the signal BLANK to low while the timer circuit signals that the blanking time $T_{BLANK}$ has not elapsed yet.

Next, the blanking circuit 1040 monitors at a step 1006 the trigger signal $T_{ZCD}$ (or the signal at the output of the comparator 2102) in order to determine the number of valleys that occur after the transformer demagnetization until the first valley is detected after the time $T_{BLANK}$ has elapsed. For example, for this purpose, the blanking circuit 1040 may reset the count value k between the instants $t_1$ and $t_2$, and preferably at the instant when the switch SW is opened (instant $t_1$). Next, while the signal of the timer circuit indicates that the blanking time $T_{BLANK}$ has not yet elapsed, this count value k may be increased at each valley, e.g., at each trigger in the signal $T_{ZCD}$.

Next, the blanking circuit 1040 determines at a step 1008 the value of the parameter $k_M$. Specifically, in various embodiments, the blanking circuit 1040 compares the current value of the parameter $k_M$ with the count value k, and when the count value k is greater than the parameter $k_M$, i.e., $k > k_M$, the blanking circuit 1040 stores the current count value k as parameter $k_M$, i.e., $k_M = k$. Thus, essentially, the parameter $k_M$ indicates the maximum value of the count value k.

At a verification step 1010, the blanking circuit 1040 compares the current count value k with the parameter $k_M$.

In case the count value k does not correspond to the value $k_M$ and is thus smaller than the value $k_M$ (output "N" of the verification step 1010), the blanking circuit 1040 proceeds to a step 1012, where the blanking circuit 1040 signals that the next valley should be skipped, e.g., by maintain the signal BLANK at low. At a following step 1014, the blanking circuit 1040 waits then for the next valley (in line with the description of step 1006), increases the count value k by one, and returns to the step 1008.

In case the count value corresponds to the value $k_M$ (output "Y" of the verification step 1010), the blanking circuit 1040 proceeds to a step 1018.

Substantially, the steps 1004-1014 implement a loop in which the signal BLANK is set to low (thus maintaining switched-off the switch SW) until the blanking time $T_{BLANK}$ has elapsed and the value k corresponds to the value $k_M$.

Generally, as schematically shown via a step 1016, instead of determining at the step 1006 the number of valleys during the blanking time $T_{BLANK}$, the blanking circuit 1040 could also use directly the steps 1008-1014 in order to sequentially increase the count value k while the blanking time $T_{BLANK}$ has not elapsed yet. For this purpose, the blanking circuit 1040 may verify at the step 1010 or the additional verification step 1016 whether the blanking time $T_{BLANK}$ has elapsed. In case the blanking time $T_{BLANK}$ has not elapsed (output N of the verification step 1012), the blanking circuit 1040 may return to the step 1012. Conversely (output Y of the verification step 1012), the blanking circuit 1040 may proceed to the step 1018.

Thus, the blanking circuit 1040 is configured (via the steps 1006-1016) to monitor the number k of valleys until both of the following conditions are satisfied:
the timer circuit of the blanking circuit 1040 indicates that the blanking time $T_{BLANK}$ has elapsed, and
the number k of valleys has reached or exceeds a given maximum value $k_M$.

In case, the number k is greater than the maximum value $k_M$ (i.e., the number of valleys during the blanking time $T_{BLANK}$ is greater than the value $k_M$), the blanking circuit 1040 stores the current number k as new maximum value $k_M$, thereby, e.g., increasing the value $k_M$ due to a load reduction or an increase of the input voltage Vin.

Assuming that initially no blanking occurs, i.e., k=0, and $k_M$=0, a load reduction may result in a frequency increase until one or more valleys k fall within the blanking interval and the respective number k of valleys will also be stored as parameter $k_M$. In case the load increases again, the blanking circuit 1040 will continue to skip $k_M$ valleys, thereby implementing a valley-lock function.

Thus, the steps 1004-10016 essentially follow a load reduction, but do not handle a load increase.

Accordingly, in various embodiments, the blanking circuit 1040 is also configured to reset the value $k_M$ when given conditions are met.

Specifically, in the embodiment shown in FIG. 7, the blanking circuit 1040 is configured to store the number $k_{QR}$ of valleys during the blanking interval $T_{BLANK}$, e.g., by storing the value k at the step 1006. Alternatively, the value $k_{QR}$ may be increased only during the blanking time, thus indicating the number of valleys the converter would operate at without the valley-lock feature. Thus, in general the blanking circuit 1040 is configured to also monitor the number $k_{QR}$ of valleys until the timer circuit of the blanking circuit 1040 indicates that the blanking time $T_{BLANK}$ has elapsed.

Specifically, in case of a load increase, this value $k_{QR}$ will decrease. Accordingly, in various embodiments, the blanking circuit 1040 is configured to compare at a step 1020 the value $k_{QR}$ with the value $k_M$ or similarly k (insofar as these values should correspond at the end of the steps 1004-1018).

Specifically, in various embodiments the blanking circuit 1040 is configured to:
- determine a first condition "A" indicating a fast change by verifying whether the current value $k_{QR}$ is smaller than the current value of $k_M$ (or k) minus a first threshold value $n_H$, i.e., $k_{QR} < k_M - n_H$;
- determine a second condition "B" indicating a slow change by verifying whether the current value $k_{QR}$ is greater than the current value of $k_M$ (or k) minus the first threshold value $n_H$, but smaller than the current value of $k_M$ (or k) minus a second threshold value $n_L$, i.e., $k_M - n_H \leq k_{QR} < k_M - n_L$; and
- determine a third condition "C" indicating that no substantive change occurred by verifying whether the current value $k_{QR}$ is greater than the current value of $k_M$ (or k) minus the second threshold value $n_L$, i.e., $k_{QR} \geq k_M - n_L$.

For example, in various embodiments, the first threshold $n_H$ is two, i.e., $n_H = 2$ and the second threshold $n_L$ is one, i.e., $n_L = 1$. In this case, the blanking circuit may determine the following conditions:

$$k_{QR} < k_M - 2; \qquad \text{condition A:}$$

$$k_{QR} = k_M - 2; \text{ and} \qquad \text{condition B:}$$

$$k_{QR} > k_M - 2. \qquad \text{condition C:}$$

In various embodiments, if the blanking circuit 1040 determines the condition "A" (output "A" of the verification step 1018), the blanking circuit 1040 is configured to reset the value $k_M$ at a step 1026.

In various embodiments, the blanking circuit 1040 does not proceed directly to the step 1026, but increases at a step 1022 a fast-change count value FCNT, and compares at a step 1024 this fast-change count value FCNT with a threshold FTH.

Specifically, in the embodiment considered, in case the fast-change count value FCNT reaches the threshold FTH (output "Y" of the verification step 1024) the blanking circuit 1040 proceeds to the step 1026. Conversely (output "N" of the verification step 1024), the blanking circuit 1040 resets at a step 1032 the count value and returns to the step 1004. Thus, if the steps 1022 and 1024 are omitted, essentially the threshold FTH corresponds to one.

Similarly, the blanking circuit 1040 proceeds from the step 1026 to the step 1032 for monitoring the next switching-cycle.

Thus, in case the value $k_{QR}$ remains in the (fast-change) condition "A" for a given number FTH of switching cycles, the value $k_M$ is reset.

In various embodiments, if the blanking circuit 1040 determines the condition "B" (output "B" of the verification step 1018), the blanking circuit 1040 is configured to similarly reset the value $k_M$ at a step 1026. Specifically, in this case, the blanking circuit 1040 does not proceed directly to the step 1026, but increases at a step 1028 a slow-change count value SCNT, and compares at a step 1030 this slow-change count value SCNT with a threshold STH, wherein the threshold is greater than the threshold FTH (if the optional steps 1022 and 1024 are used).

Specifically, in the embodiment considered, in case the slow-change count value SCNT reaches the threshold STH (output "Y" of the verification step 1028) the blanking circuit 1040 proceeds to the step 1026. Conversely (output "N" of the verification step 1028), the blanking circuit 1040 proceeds to the step 1032 for monitoring the next switching-cycle.

Thus, in case the value $k_{QR}$ remains in the (slow-change) condition "B" for a given number STH of switching cycles, the value $k_M$ is reset.

Finally, if the blanking circuit 1040 determines the condition "C" (output "C" of the verification step 1018), the blanking circuit 1040 proceeds to the step 1032 for monitoring the next switching-cycle, i.e., the value $k_M$ is not reset when no substantives changes occur, thereby essentially implementing a hysteresis function.

In various embodiments, the blanking circuit 1040 is configured to:
- optionally, in response to the detection of condition A, e.g., at the step 1022, reset the count value SCNT;
- in response to the detection of condition B, e.g., at the step 1028, reset the count value FCNT; and
- in response to the detection of condition C, e.g., at a step 1034, reset the count value FCNT and the count value SCNT.

Thus, in various embodiments, the value $k_M$ is not reset for small load changes, and the value $k_M$ is reset after less switching cycles in case of greater load changes.

Figure 8:
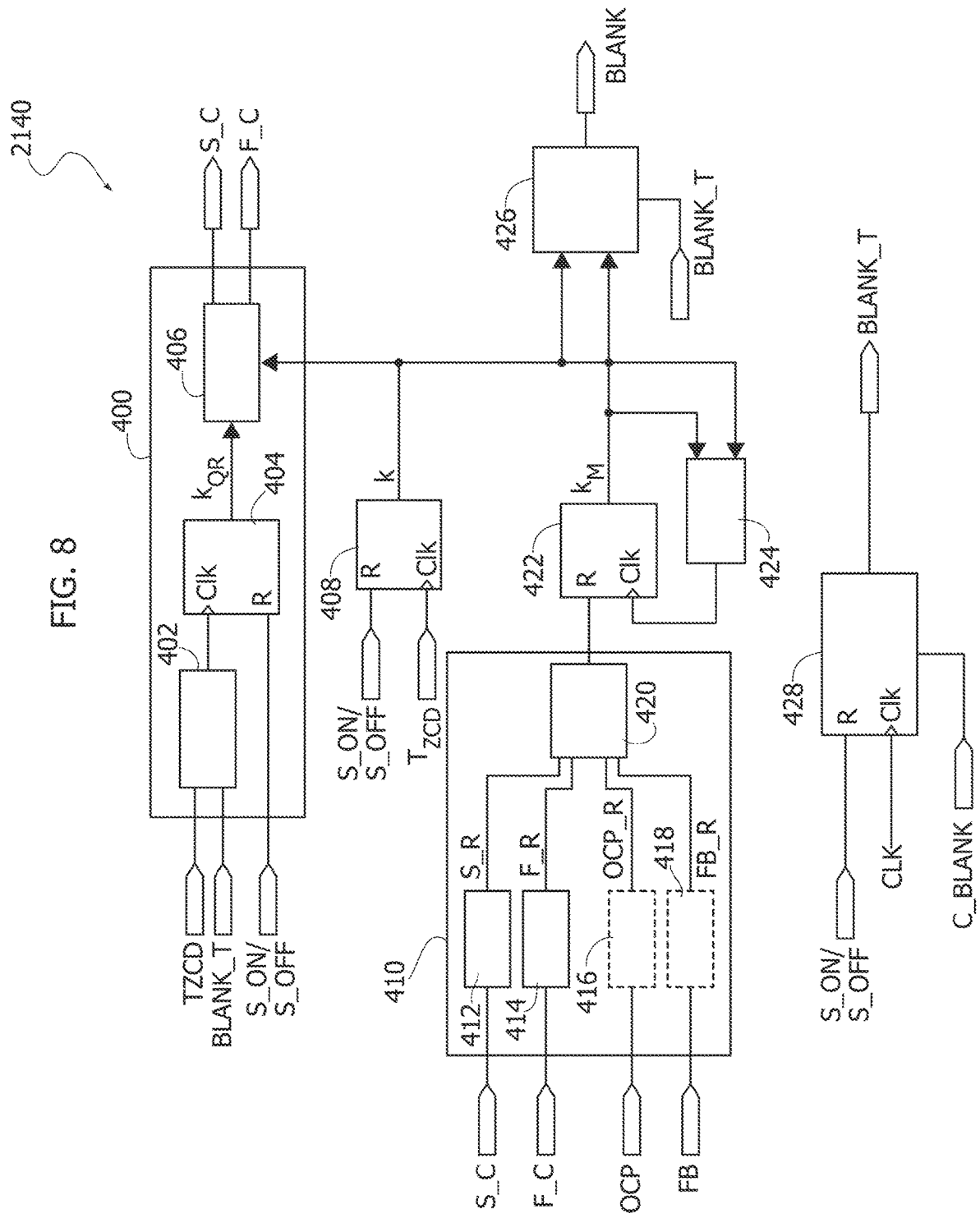
FIGS. 8, 9, 10, 11 and 12 show embodiments of various sub-circuits of the control circuits of FIG. 5 or 6.

FIG. 8 shows an embodiment of an electronic circuit configured to implement the operation of the blanking circuit 2140 described with respect to FIG. 7.

In the embodiment considered, the blanking circuit 2140 comprise a timer circuit 428 configured to monitor a time interval $T_{BLANK}$ and generate a timer signal BLANK_T when the time interval $T_{BLANK}$ elapses, e.g., with respect to the switch-on or the switch-off instant of the switch SW. For example, in the embodiment considered, the timer circuit 428 is implemented with a digital counter circuit configured to:
- reset an internal count value in response to the signal S_ON or S_OFF;
- increase the internal count value in response to a clock signal CLK; and
- set the timer signal BLANK_T to a first logic level (e.g., low) when the internal count value is smaller than a reference value C_BLANK indicative of the duration of the time interval $T_{BLANK}$ and to a second logic level (e.g., high) when the internal count value is greater than the reference value C_BLANK. As described in the foregoing, the value of the time interval $T_{BLANK}$, e.g., the value C_BLANK, may be determined as a function of the power requirements, as indicated, e.g., by the signal FB or PTH.

In the embodiment considered, the blanking circuit 2140 comprises also a valley counter 408 configured to count the valleys indicated by the signal ZCD, e.g., by increasing a count value in response to the signal $T_{ZCD}$, thereby providing the value k.

As described in the foregoing, the blanking circuit 2140 is configured to provide two additional values:
- the maximum value $k_M$ of the count value k; and
- the number of the valleys $k_{QR}$ during the time interval $T_{BLANK}$.

Thus, in general, these values may be determined as a function of the value k.

For example, in various embodiments, a comparison circuit 424 is configured to compare the current value $k_M$ with the value k and generate a trigger signal when the value k is greater than the value $k_M$. Conversely, a second circuit 422 is configured to store the value k if the comparison circuit 424 generate the trigger signal. Thus, in general, the circuit 424 may be implemented with a memory, such as latches or a register, configured to store the signal/value k in response to the trigger signal generated by the comparison circuit 424. Conversely, in the embodiment considered, the circuit 422 is implemented with a counter configured to increase its count value in response to the trigger signal generated by the comparison circuit 424.

Similarly, a circuit 400 may comprise a memory configured to store the value k in response to (e.g., in response to the rising edge of) the timer signal BLANK_T, thereby providing only the number of valleys $k_{QR}$ during the blanking interval $T_{BLANK}$. Conversely, in the embodiment considered, the circuit 400 comprises a separate counter circuit 404 configured to monitor separately the valleys during the blanking interval $T_{BLANK}$. For this purpose, the counter circuit 404 has associated a combinational logic circuit 402 configured to provide a trigger signal by combining the trigger signal $T_{ZCD}$ with the timer signal BLANK_T. Thus, in various embodiments, the counter circuit 404 is configured to increase the signal/value $k_{QR}$ in response to the trigger signal $T_{ZCD}$ only when the signal BLANK_T indicates that the time interval $T_{BLANK}$ has not elapsed, i.e., when the signal BLANK_T has the first logic level.

Thus, in the embodiment considered, three separate counters are used to generate the signals k, $k_M$ and $k_{QR}$, but in general also a single counter (or two counters) could be used.

As described in the foregoing, once the time interval $T_{BLANK}$ has elapsed, the blanking circuit 2140 should enable the activation of the switch SW with the next valley. For example, in the embodiment considered, a comparison circuit 426 is configured to set the blanking signal BLANK (see, e.g., FIG. 4) to:

a first logic level (e.g., low), when the time interval $T_{BLANK}$ has not elapsed or the values k is smaller than the value $k_M$, i.e., $k<k_M$; and a second logic level (e.g., high), when the time interval $T_{BLANK}$ has elapsed and the values k and $k_M$ correspond, i.e., $k=k_M$.

For example, in order to determine whether the time interval $T_{BLANK}$ has elapsed, the comparison circuit 426 may monitor the signal BLANK_T.

Thus, essentially the blocks 402, 403, 408, 422, 424 and 426 implement the steps 1002-1018 of FIG. 18.

Specifically, these blocks determine the values k, $k_M$ and $k_{QR}$ and follow and increase of the maximum value $k_M$. However, as described in the foregoing, the value $k_{QR}$ should be used to decide whether the value $k_M$ should be reset. More specifically, as described in the foregoing, the values k (stored in a counter 408) and $k_{QR}$ (stored in a counter or only a memory 404) should be reset for each switching cycle prior to the instant of the demagnetization of the transformer. For example, in various embodiments, these circuits 404 and 408 are reset in response to the signals S_ON or S_OFF, e.g., in response to a turn-on of the power switch SW.

Thus, once the signal $T_{ZCD}$ signals valleys in the signal ZCD, the counter k increases (and similarly the count value $k_{QR}$). In parallel, the blanking circuit 4140 performs several operations:

the comparison circuit 424 compares the value k with the current value $k_M$ and updates the value $k_M$ (i.e., stores the value k or increases the value $k_M$), when the value k is greater than the current value $k_M$;

while the blanking interval $T_{BLANK}$ has not elapsed, the circuit 400 updates the value $k_{QR}$ (i.e., stores the value k or increases the value $k_{QR}$); and the comparison circuit 426 sets the signal BLANK to the second logic level (e.g., high), when the time interval $T_{BLANK}$ has elapsed and the values k and $k_M$ correspond.

Conversely, the value $k_M$ (stored in a counter or only a memory 422) should be reset as a function of the value $k_{QR}$.

In the embodiment considered, the circuit 400 has thus associated a comparison circuit 406, which is configured to implement the comparison operation at step 1020 of FIG. 7.

Specifically, this comparison circuit 406 is configured to compare the value $k_{QR}$ with the value $k_M$ or k. More specifically, in the embodiment considered the comparison circuit 406 is configured to compare the value $k_{QR}$ with the value k, because this avoids any additional combinational or sequential logic circuit, because these signals increase during the blanking interval $T_{BLANK}$ in parallel and only when the blanking interval $T_{BLANK}$ ends, the value k may further increase. However, the comparison may also be started only when the blanking interval $T_{BLANK}$ elapses, e.g., by starting the comparison in response to the signal BLANK_T.

In various embodiments, the comparison circuit 406 provides at output one or more comparison signals indicating whether the condition "A", "B" or "C" (see description of step 1020) is met. For example, in the embodiment considered, two signals S_C and F_C are used, which are set to:

F_C="1" and S_C="1" for condition A, e.g., for $k_{QR}<k_M-2$;

F_C="0" and S_C="1" for condition B, e.g., for $k_{QR}=k_M-2$; and

F_C="0" and S_C="0" for condition C, e.g., for $k_{QR}>k_M-2$.

In the embodiment considered, the signals F_C and S_C are elaborated by a circuit 410 configured to selectively reset the memory or counter 422.

Specifically, in the embodiment considered, the circuit 410 comprises a first sub-circuit 412 configured to implement steps 1028 and 1030, and a second sub-circuit 414 configured to implement steps 1022 and 1024.

Figure 9:
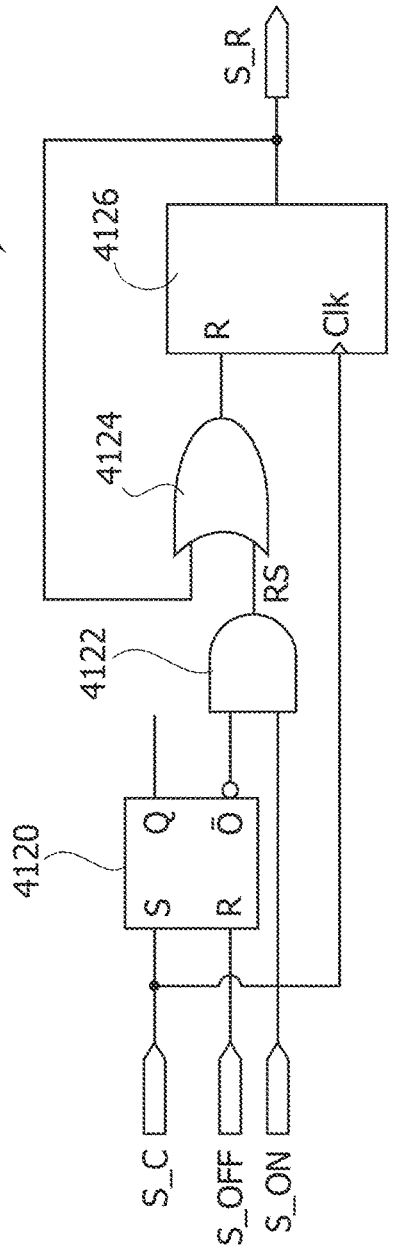

For example, FIG. 9 shows an embodiment of the circuit 412.

In the embodiment considered, the circuit 412 is implemented with an automatic reload counter circuit, which is increased in response to the signal S_C. Specifically, in the embodiment considered, the circuit 412 comprises a counter 4126 configured to:

increase an internal count value in response to the signal S_C;

generate/set a trigger signal S_R when the internal count value reaches a given threshold, e.g., 256 or 512; and reset the internal count value when the trigger signal S_R is set.

In various embodiments, the circuit 4126 may have associated an additional reset circuit configured to generate an additional reset signal RS for the counter 4126 when the signal S_C is low when the switch SW is turned on. For example, in the embodiment considered, the reset circuit comprises:

a latch 4120, such as a set-reset latch, configured to set its output Q to high when the signal S_C is set; this latch 4120 may be reset once during each switching cycle, e.g., in response to the signal S_OFF; and a logic gate 4122, such as a AND gate, configured to set the reset signal RS when the output Q of the latch 4120 is low when the switch is closed, e.g., when the output Q of the latch 4120 is low and the signal S_ON is high.

In the embodiment considered, the reset terminal of the counter 4126 may thus receive, e.g., via a logic OR gate 4124, the trigger signal S_R and the reset signal RS.

Generally, the circuit 414 generates a trigger signal F_R in response to the signal F_C. In various embodiments the signal F_R may correspond to the signal F_C.

Figure 10:
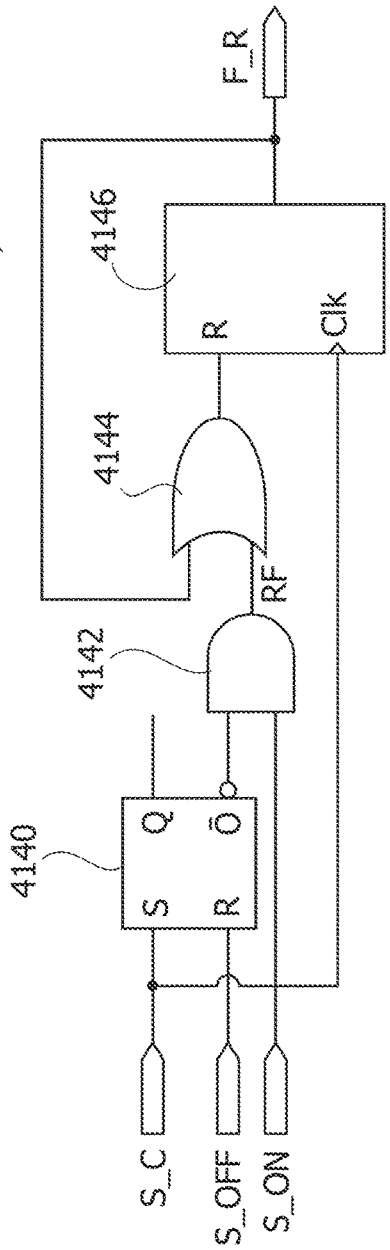

Conversely, FIG. 10 shows an embodiment of the circuit 414, which essentially corresponds to the circuit 412.

Specifically, in the embodiment considered, also the circuit 414 is implemented with an automatic reload counter circuit, which is increased in response to the signal F_C. Specifically, in the embodiment considered, the circuit 414 comprises a counter 4146 configured to:

increase an internal count value in response to the signal F_C;
generate/set the trigger signal F_R when the internal count value reaches a given threshold, e.g., 4 or 8; and
reset the internal count value when the trigger signal F_R is set.

In various embodiments, also the circuit 4146 may have associated an additional reset circuit configured to generate an additional reset signal RF for the counter 4146 when the signal F_C is low when the switch SW is turned on. For example, in the embodiment considered, the reset circuit comprises:

a latch 4140, such as a set-reset latch, configured to set its output Q to high when the signal F_C is set; this latch 4140 may be reset once during each switching cycle, e.g., in response to the signal S_OFF; and
a logic gate 4142, such as a AND gate, configured to set the reset signal RF when the output Q of the latch 4140 is low when the switch SW is closed, e.g., when the output Q of the latch 4140 is low and the signal S_ON is high.

In the embodiment considered, the reset terminal of the counter 4146 may thus receive, e.g., via a logic OR gate 4144 the trigger signal F_R and the reset signal RF.

Accordingly, in the embodiment considered, the memory/counter 422 is reset when the signal S_R is set, e.g., when the signal S_C goes to high during given first number of switching cycles, or when the signal F_R is set, e.g., when the signal F_C goes to high during given second number of switching cycles, where the first number is greater than the second number.

For example, for this purpose a combinational logic circuit 420, such as a OR gate, may generate the reset signal for the memory/counter 422 by combining the signals S_R and F_R.

In various embodiments, the circuit 410 may comprises further sub-circuits, which may generate a reset of the memory/counter 422.

For example, as described in the foregoing, the memory/counter 422 is not reset when the circuit operates in condition C, i.e., $k_{QR} \leq k_M - n_L$. While this behavior is desired when the control circuit 410a has to avoid jumps between valleys, this verification operation also blocks a reset of the value $k_M$, when the switch-off duration increases and the converter could be switched with the first valley, because the above described operation cannot reset the value $k_M$ when $k_M \leq n_L$, e.g., when $k_M = 1$.

Thus, in various embodiments, the circuit 410 may comprise a sub-circuit configured to detect this condition.

For example, the inventors have observed, that this condition may be detected because the converter does not operate with the "optimal" drive conditions, e.g., because:
when the feedback signal FB is an error signal, this signal may increase; and/or the peak value of the signal CS may increase.

Accordingly, in various embodiments, the circuit 410 may comprise a feedback-tracking circuit 418 configured to monitor the variation of the feedback signal FB.

Figure 11:
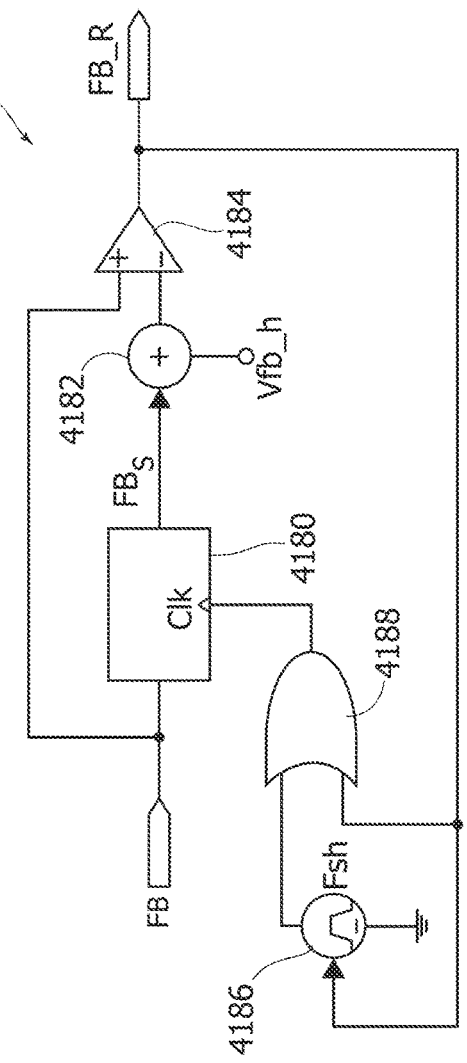

For example, FIG. 11 shows a possible embodiment of the circuit 416.

In the embodiment considered, the circuit 416 is configured to sampled at constant rate $F_{SH}$ the feedback signal FB, and the sampled feedback signal FBs is compared with the current feedback signal FB.

For this purpose, the circuit 416 may comprise:

a trigger generator 4186, e.g., implemented with a counter, configured to generate a trigger signal at the rate $F_{SH}$; and
a sample and hold circuit 4180 configured to sample the feedback signal FB in response to the trigger signal provided by the trigger generator 4186.

In the embodiment considered, the feedback signal FB and the sampled feedback signal FBs are provided to a comparator 4184. Specifically, in the embodiment considered, the signals are not compared directly, but an offset $V_{fb\_h}$ is added at an adder 4182 to the sample feedback value FBs, i.e., the comparator 4184 generates/sets a signal FB_R when $FB > FBs + V_{fb\_h}$.

Accordingly, in the embodiment considered, the circuit 418 is configured to periodical store the feedback signal FB and generate the trigger signal FB_R when the feedback signal increases more than $V_{fb\_h}$.

In various embodiments, in this case, the sample-and-hold circuit 4180 may store also immediately the feedback signal FB (as shown via an OR gate 4188) and/or restart the trigger generator 4186.

Accordingly, the combinational logic circuit 420 (FIG. 8) may also receive at input the signal FB_R, i.e., reset the memory/counter 422 in response to the signal FB_R.

Figure 12:
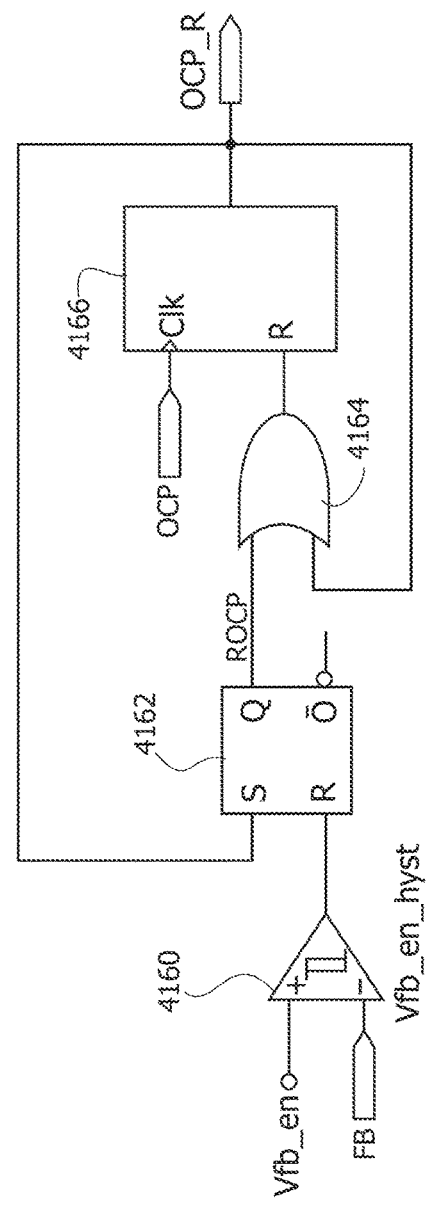

Conversely, FIG. 12 shows an embodiment of a circuit 416 configured to monitor the peak value of the signal CS.

In the embodiment considered, the circuit 416 is implemented with an automatic reload counter circuit, which is increased when the signal CS exceeds a given threshold value. For example, in the embodiment considered, the circuit 416 comprises a counter 4166 configured to:

increase an internal count value in response to the signal OCP provided by the comparator 2114 (see FIG. 4), insofar as this comparator already compares the signal CS with the threshold OTH;
generate/set the trigger signal OCP_R when the internal count value reaches a given threshold, e.g., 4 or 8; and
reset the internal count value when the trigger signal OCP_R is set.

In various embodiments, also the circuit 4146 may have associated an additional reset circuit configured to generate an additional reset signal ROCP for the counter 4166, which is used to disable the counter 4146 when the feedback signal FB is smaller than a given threshold value.

For example, in the embodiment considered, the reset circuit comprises:

a comparator 4160 configured to determine whether the feedback signal FB is greater that a threshold value $V_{FB\_EN}$, such as 2.5V, preferably a comparator with a given hysteresis $V_{FB\_EN\_HYST}$, such as 100 mV; and
a latch 4162, such as a set-reset latch, configured to set its output Q (providing the signal ROCP) to high when the signal OCP_R is set, and wherein the latch 4140 is reset in response to the signal at the output of the comparator 4160.

In the embodiment considered, the reset terminal of the counter 4166 may thus receive, e.g., via a logic OR gate 4164 the trigger signal OCP_R and the reset signal ROCP.

Thus, when using the signal at the output Q of the latch 4162 as reset signal ROCP, this signal ROCP will be set to high in response to the first trigger in the signal OCP_R, and then will remain set to high until the signal FB is greater than the threshold value $V_{FB\_EN}$. Thus, when the signal FB is small, the signal ROCP will remain high and the counter 4166 remains reset, thereby inhibiting the generation of further triggers in the signal OCP_R.

Accordingly, the combinational logic circuit 420 (FIG. 8) may also receive at input the signal OCP_R, i.e., reset the memory/counter 422 in response to the signal OCP_R.

Of course, without prejudice to the principle of the disclosure, the details of construction and the embodiments may vary widely with respect to what has been described and illustrated herein purely by way of example, without thereby departing from the scope of the present disclosure, as defined by the ensuing claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit for a flyback converter, the flyback converter including:
   a positive and a negative input terminal configured to receive an input voltage;
   first and second output terminals configured to provide an output voltage or output current;
   a transformer having a primary winding and a secondary winding, wherein a first terminal of the primary winding is connected to the positive input terminal and a second terminal of the primary winding represents a switching node;
   a first electronic switch, connected between the switching node and the negative input terminal; and
   a second electronic switch connected with the secondary winding in series between the two output terminals,
   wherein the control circuit is configured to generate a drive signal for the first electronic switch, wherein the control circuit is configured to generate switching cycles by setting the drive signal to a first logic level for a switch-on duration for closing the first electronic switch and a second logic level for a switch-off duration for opening the first electronic switch, and
   wherein the control circuit comprises:
   a first terminal configured to be connected to a current measurement circuit and configured to generate a current measurement signal indicative of a current flowing through the primary winding during the switch-on duration; and
   a second terminal configured to be connected to a valley monitoring circuit and configured to provide a valley signal indicative of valleys in a voltage at the switching node;
   a comparison circuit configured to generate a switch-off signal by comparing the current measurement signal with a current measurement threshold signal;
   a valley detection circuit configured to generate a trigger in a trigger signal when the valley signal indicates a valley in the voltage at the switching node; and
   a blanking circuit configured to generate a switch-on signal by combining the trigger signal with a timer signal provided by a timer circuit, the timer signal indicating whether a blanking time-interval has elapsed,
   wherein the blanking circuit is configured to:
   start the timer circuit in response to the switch-on signal or the switch-off signal;
   monitor during each switching cycle a first number of triggers in the trigger signal, wherein the first number is indicative of the number of valleys in the voltage at the switching node until the first electronic switch is closed; and
   monitor during each switching cycle a second number of triggers in the trigger signal until the timer signal indicates that the blanking time-interval has elapsed, wherein the second number is indicative of the number of valleys in the voltage at the switching node during the blanking time-interval.

2. The control circuit according to claim 1, further comprising: a circuit configured to: in response to the switch-on signal, set the drive signal to the first logic level for closing the first electronic switch; and in response to the switch-off signal, set the drive signal to the second logic level for opening the first electronic switch.

3. The control circuit according to claim 1, wherein the blanking circuit is further configured to:
   determine whether the timer signal indicates that the blanking time-interval has elapsed and whether the first number reaches or exceeds a maximum value;
   store the first number as new maximum value in response to the first number exceeding the maximum value;
   disable the switch-on signal in response to the timer signal indicating that the blanking time-interval has not elapsed or in response to the second number being smaller than the maximum value; and
   set the switch-on signal in response to the trigger signal in response to the timer signal indicating that the blanking time-interval has elapsed and the second number reaches or exceeds the maximum value.

4. The control circuit according to claim 3, wherein the blanking circuit is further configured to:
   selectively reset the maximum value by comparing the second number with the first number or the maximum value.

5. The control circuit according to claim 4, wherein the blanking circuit comprises a first comparator circuit configured to set a blanking signal by comparing the second number with the first number, the blanking circuit further configured to:
   determine a first condition in response to the second number being smaller than the first number minus a first threshold value;
   determine a second condition in response to the second number being equal to or greater than the first number minus the first threshold value, but smaller than the first number minus a second threshold value; and
   determine a third condition in response to the second number being equal to or greater than the first number minus the second threshold value.

6. The control circuit according to claim 5, wherein the blanking circuit comprises a reset circuit configured to:

reset the maximum value in response to the first comparator circuit indicating the first condition for a first number of consecutive switching cycles; and reset the maximum value in response to the first comparator circuit indicating the second condition for a second number of consecutive switching cycles, the second number of consecutive switching cycles being greater than the first number of consecutive switching cycles.

7. The control circuit according to claim 6, comprising:
a terminal configured to be connected to a feedback circuit and configured to provide a feedback signal indicative of the output voltage or output current; and
a regulator circuit comprising an integral component configured to generate the current measurement threshold signal as a function of the feedback signal.

8. The control circuit according to claim 7, wherein the reset circuit is configured to periodically store a value of the feedback signal and reset the maximum value when the feedback signal increases more than a given amount.

9. The control circuit according to any of claim 6, wherein the reset circuit is configured to:
determine whether the current measurement signal reaches a maximum threshold signal, and
reset the maximum value in response to the current measurement signal reaching the maximum threshold signal for a third number of consecutive switching cycles.

10. The control circuit according to claim 1, wherein the blanking circuit comprises a first digital counter configured to increase the first number in response to the trigger signal and reset the first number in response to the switch-on signal or the switch-off signal.

11. The control circuit according to claim 10, wherein the blanking circuit comprises a second digital counter configured to, when the timer signal indicates that the blanking time-interval has not elapsed, increase the second number in response to the trigger signal and reset the second number in response to the switch-on signal or the switch-off signal.

12. The control circuit according to claim 1, wherein the blanking circuit comprises:
a combinational logic circuit configured to generate the switch-on signal by combining the trigger signal with a blanking signal, and
a comparator circuit configured to set the blanking signal to:
a first logic level when the timer signal indicates that the blanking time-interval has not elapsed or the second number is smaller than a given maximum value; and
a second logic level when the timer signal indicates that the blanking time-interval has elapsed and the second number reaches or exceeds the maximum value.

13. The control circuit according to claim 1, wherein the timer circuit is implemented with a digital counter circuit configured to:
reset an internal count value in response to the switch-on signal or the switch-off signal;
increase the internal count value in response to a clock signal; and
set the timer signal to a first logic level when the internal count value is smaller than a reference value indicative of the duration of the blanking time-interval and to a second logic level when the internal count value is greater than the reference value, wherein the reference value is determined as a function of the feedback signal, the current measurement signal or the current measurement threshold signal.

14. The control circuit according to claim 1, wherein the valley detection circuit comprises:
a comparator circuit configured to compare the valley signal with a reference signal; and
an edge detector configured to generate a pulse in the trigger signal when the signal at the output of the comparator circuit is set.

15. An integrated circuit, comprising the control circuit according to claim 1.

16. A flyback converter, comprising:
a positive and a negative input terminal configured to receive an input voltage;
two output terminals configured to provide an output voltage or output current;
a transformer having a primary winding and a secondary winding, wherein a first terminal of the primary winding is connected to the positive input terminal and a second terminal of the primary winding represents a switching node;
a first electronic switch, connected between the switching node and the negative input terminal;
a second electronic switch connected with the secondary winding in series between the two output terminals;
a current measurement circuit configured to generate a current measurement signal indicative of a current flowing through the primary winding T1 during the switch-on duration;
a valley monitoring circuit configured to provide a valley signal indicative of demagnetization of valleys in the voltage at the switching node; and
a control circuit configured to generate a drive signal for the first electronic switch, wherein the control circuit is configured to generate switching cycles by setting the drive signal to a first logic level for a switch-on duration for closing the first electronic switch and a second logic level for a switch-off duration for opening the first electronic switch, the control circuit including:
a comparison circuit configured to generate a switch-off signal by comparing the current measurement signal with a current measurement threshold signal;
a valley detection circuit configured to generate a trigger in a trigger signal when the valley signal indicates a valley in the voltage at the switching node; and
a blanking circuit configured to generate a switch-on signal by combining the trigger signal with a timer signal provided by a timer circuit, the timer signal indicating whether a blanking time-interval has elapsed,
wherein the blanking circuit is configured to:
start the timer circuit in response to the switch-on signal or the switch-off signal;
monitor during each switching cycle a first number of triggers in the trigger signal, wherein the first number is indicative of the number of valleys in the voltage at the switching node until the first electronic switch is closed; and
monitor during each switching cycle a second number of triggers in the trigger signal until the timer signal indicates that the blanking time-interval has elapsed, wherein the second number is indicative of the number of valleys in the voltage at the switching node during the blanking time-interval.

17. The flyback converter according to claim 16, wherein the blanking circuit is further configured to:

determine whether the timer signal indicates that the blanking time-interval has elapsed and whether the first number reaches or exceeds a maximum value;

store the first number as new maximum value in response to the first number exceeding the maximum value;

disable the switch-on signal in response to the timer signal indicating that the blanking time-interval has not elapsed or in response to the second number being smaller than the maximum value; and set the switch-on signal in response to the trigger signal in response to the timer signal indicating that the blanking time-interval has elapsed and the second number reaches or exceeds the maximum value.

18. The flyback converter according to claim 16, wherein the valley monitoring circuit comprising an auxiliary winding of the transformer.

19. A method of operating a flyback converter, the flyback converter including:

a positive and a negative input terminal configured to receive an input voltage;

first and second output terminals configured to provide an output voltage or output current;

a transformer having a primary winding and a secondary winding, wherein a first terminal of the primary winding is connected to the positive input terminal and a second terminal of the primary winding represents a switching node;

a first electronic switch, connected between the switching node and the negative input terminal;

a second electronic switch connected with the secondary winding in series between the two output terminals; and a control circuit configured to generate a drive signal for the first electronic switch, wherein the control circuit is configured to generate switching cycles by setting the drive signal to a first logic level for a switch-on duration for closing the first electronic switch and a second logic level for a switch-off duration for opening the first electronic switch, wherein the control circuit includes:

a first terminal configured to be connected to a current measurement circuit and configured to generate a current measurement signal indicative of a current flowing through the primary winding during the switch-on duration; and a second terminal configured to be connected to a valley monitoring circuit and configured to provide a valley signal indicative of valleys in a voltage at the switching node;

a comparison circuit configured to generate a switch-off signal by comparing the current measurement signal with a current measurement threshold signal;

a valley detection circuit configured to generate a trigger in a trigger signal when the valley signal indicates a valley in the voltage at the switching node; and a blanking circuit configured to generate a switch-on signal by combining the trigger signal with a timer signal provided by a timer circuit, the timer signal indicating whether a blanking time-interval has elapsed, the method comprising:

starting the timer circuit in response to the switch-on signal or the switch-off signal;

monitoring during each switching cycle a first number of triggers in the trigger signal, wherein the first number is indicative of the number of valleys in the voltage at the switching node until the first electronic switch is closed; and monitoring during each switching cycle a second number of triggers in the trigger signal until the timer signal indicates that the blanking time-interval has elapsed, wherein the second number is indicative of the number of valleys in the voltage at the switching node during the blanking time-interval.

20. The method according to claim 19, further comprising:

determining whether the timer signal indicates that the blanking time-interval has elapsed and whether the first number reaches or exceeds a given maximum value, and storing the first number as a new maximum value in response to the first number exceeding the maximum value;

disabling the switch-on signal in response to the timer signal indicating that the blanking time-interval has not elapsed or the second number is smaller than the maximum value; and setting the switch-on signal in response to the trigger signal in response to the timer signal indicating that the blanking time-interval has elapsed and the second number reaches or exceeds the maximum value; and selectively resetting the maximum value by comparing the second number with the first number or the maximum value.

* * * * *